(12) United States Patent
Watanabe et al.

(10) Patent No.: US 11,787,386 B2
(45) Date of Patent: Oct. 17, 2023

(54) DRIVING SUPPORT DEVICE

(71) Applicant: AISIN CORPORATION, Kariya (JP)

(72) Inventors: Kazuya Watanabe, Anjo (JP); Tetsuya Maruoka, Okazaki (JP); Kinji Yamamoto, Anjo (JP)

(73) Assignee: AISIN CORPORATION, Kariya (JP)

( * ) Notice: Subject to any disclaimer, the term of this patent is extended or adjusted under 35 U.S.C. 154(b) by 734 days.

(21) Appl. No.: 16/454,501

(22) Filed: Jun. 27, 2019

(65) Prior Publication Data

US 2020/0001855 A1 Jan. 2, 2020

(30) Foreign Application Priority Data

Jun. 28, 2018 (JP) .................. 2018-123604

(51) Int. Cl.
*B60W 10/20* (2006.01)
*B60D 1/24* (2006.01)
*B60W 30/12* (2020.01)
*G01B 7/30* (2006.01)
*G01B 11/26* (2006.01)
(Continued)

(52) U.S. Cl.
CPC ............ *B60W 10/20* (2013.01); *B60D 1/245* (2013.01); *B60W 30/12* (2013.01); *G01B 7/30* (2013.01); *G01B 11/26* (2013.01); *B60K 2370/126* (2019.05); *B60W 2300/14* (2013.01);
(Continued)

(58) Field of Classification Search
CPC ........ B60R 1/001–003; B60R 2300/70; B60R 2300/105; B60R 2300/207; B60R 2300/303–308; H04N 7/18–181; G02B 2027/014; B62D 15/0275; B62D 15/0295; B62D 13/06; B62D 15/0285; B60W 2520/22; B60W 10/20; B60W 10/207; B60W 30/18036; B60W 2300/14; B60W 30/12; B60W 2710/207; B60K 37/06; B60K 2370/173; B60D 1/245; B60D 1/62;
(Continued)

(56) References Cited

U.S. PATENT DOCUMENTS 8,976,246 B1 3/2015 Rappuhn
9,108,598 B2 8/2015 Headley
(Continued)

FOREIGN PATENT DOCUMENTS

JP 2014-502582 A 2/2014
JP 2017-212482 A 11/2017
(Continued)

*Primary Examiner* — Aniss Chad
*Assistant Examiner* — Madison R Hughes
(74) *Attorney, Agent, or Firm* — Sughrue Mion, PLLC

(57) ABSTRACT

A driving support device that controls a steering unit such that a hitch angle between a tow vehicle, which tows a towed vehicle, and the towed vehicle becomes a target angle set as a target includes: an image control unit that causes a display unit to perform display of a captured image obtained by an imaging unit provided in the tow vehicle or the towed vehicle in a mirror image state and display of a setting image including a slider indicating the target angle input through an input unit; an acquisition unit that acquires input of the target angle at the time of backward movement of the tow vehicle from the input unit, in a state where the setting image is displayed; and a setting unit that sets the target angle based on the input.

15 Claims, 13 Drawing Sheets

(51) Int. Cl.
   *B60D 1/62* (2006.01)
   *B62D 13/06* (2006.01)
   *B62D 15/02* (2006.01)

(52) U.S. Cl.
   CPC ... *B60W 2520/22* (2013.01); *B60W 2710/207* (2013.01); *G05D 2201/0213* (2013.01)

(58) Field of Classification Search
   CPC .... B60T 2230/08; B60G 2400/97–972; G01B 7/30; G01B 11/26; G05D 2201/0213
   See application file for complete search history.

(56) References Cited

U.S. PATENT DOCUMENTS

| | | | |
|---|---|---|---|
| 9,809,250 | B2 | 11/2017 | Lavoie et al. |
| 9,854,209 | B2 | 12/2017 | Aich et al. |
| 2008/0231701 | A1 | 9/2008 | Greenwood et al. |
| 2011/0106380 | A1* | 5/2011 | Wang .................. B62D 15/028 348/148 |
| 2012/0185131 | A1 | 7/2012 | Headley |
| 2014/0160276 | A1 | 6/2014 | Pliefke et al. |
| 2015/0217693 | A1* | 8/2015 | Pliefke .................. H04N 7/183 348/118 |
| 2015/0307129 | A1 | 10/2015 | Headley |
| 2015/0367886 | A1* | 12/2015 | Lavoie ............... B62D 15/0275 701/41 |
| 2017/0253186 | A1 | 9/2017 | Nakai |
| 2018/0043828 | A1* | 2/2018 | Lu .............................. B60R 1/00 |
| 2018/0151152 | A1 | 3/2018 | Hirosawa |
| 2018/0186290 | A1* | 7/2018 | Ward ........................ B60R 1/00 |
| 2019/0077454 | A1* | 3/2019 | Stroebel ................ B60W 10/20 |
| 2019/0276078 | A1* | 9/2019 | Pourrezaei Khaligh ..................... B62D 15/0295 |
| 2020/0353969 | A1* | 11/2020 | Sypitkowski ........ B62D 15/028 |

FOREIGN PATENT DOCUMENTS

| | | |
|---|---|---|
| JP | 2018-88642 A | 6/2018 |
| WO | 2016/042733 A1 | 3/2016 |

* cited by examiner

DRIVING SUPPORT DEVICE

CROSS REFERENCE TO RELATED APPLICATIONS

This application is based on and claims priority under 35 U.S.C. § 119 to Japanese Patent Application 2018-123604, filed on Jun. 28, 2018, the entire contents of which are incorporated herein by reference.

TECHNICAL FIELD

This disclosure relates to a driving support device.

BACKGROUND DISCUSSION

A driving support device that supports driving of a tow vehicle that tows a towed vehicle is known. In such a driving support device, a direction of the towed vehicle can be set by operating a dial.

Examples of the related art include U.S. Pat. Nos. 9,809,250, 9,108,598, US 2014-160276A, US 2008-231701A, and U.S. Pat. No. 9,854,209.

However, since a state of the towed vehicle cannot be learned in the driving support device described above, operability is low.

Thus, a need exists for a driving support device in a tow vehicle which is not susceptible to the drawback mentioned above.

SUMMARY

A driving support device according to an embodiment of this disclosure controls a steering unit such that a hitch angle between a tow vehicle, which tows a towed vehicle, and the towed vehicle becomes a target angle set as a target. The driving support device includes an image control unit that causes a display unit to perform display of a captured image obtained by an imaging unit provided in the tow vehicle or the towed vehicle in a mirror image state and display of a setting image including a slider indicating the target angle input through an input unit, an acquisition unit that acquires input of the target angle at the time of backward movement of the tow vehicle from the input unit, in a state where the setting image is displayed, and a setting unit that sets the target angle based on the input.

The driving support device according to the embodiment of this disclosure acquires a target angle from a passenger including a driver via the setting image in a state where display in a mirror image state, in which the captured image from the imaging unit is brought into a mirror image state, and the setting image including the slider are displayed. Accordingly, the driving support device can make an operation direction of the slider to match a backward movement direction of the towed vehicle included in the display in the mirror image state. As a result, the driving support device can provide the passenger with an environment where the target angle can be set while checking a direction where steering of the towed vehicle can be controlled, and thus improve operability.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

The same configuration elements of exemplary embodiments below will be assigned with a common reference sign, and overlapping description will be omitted as appropriate.

First Embodiment

Figure 1:
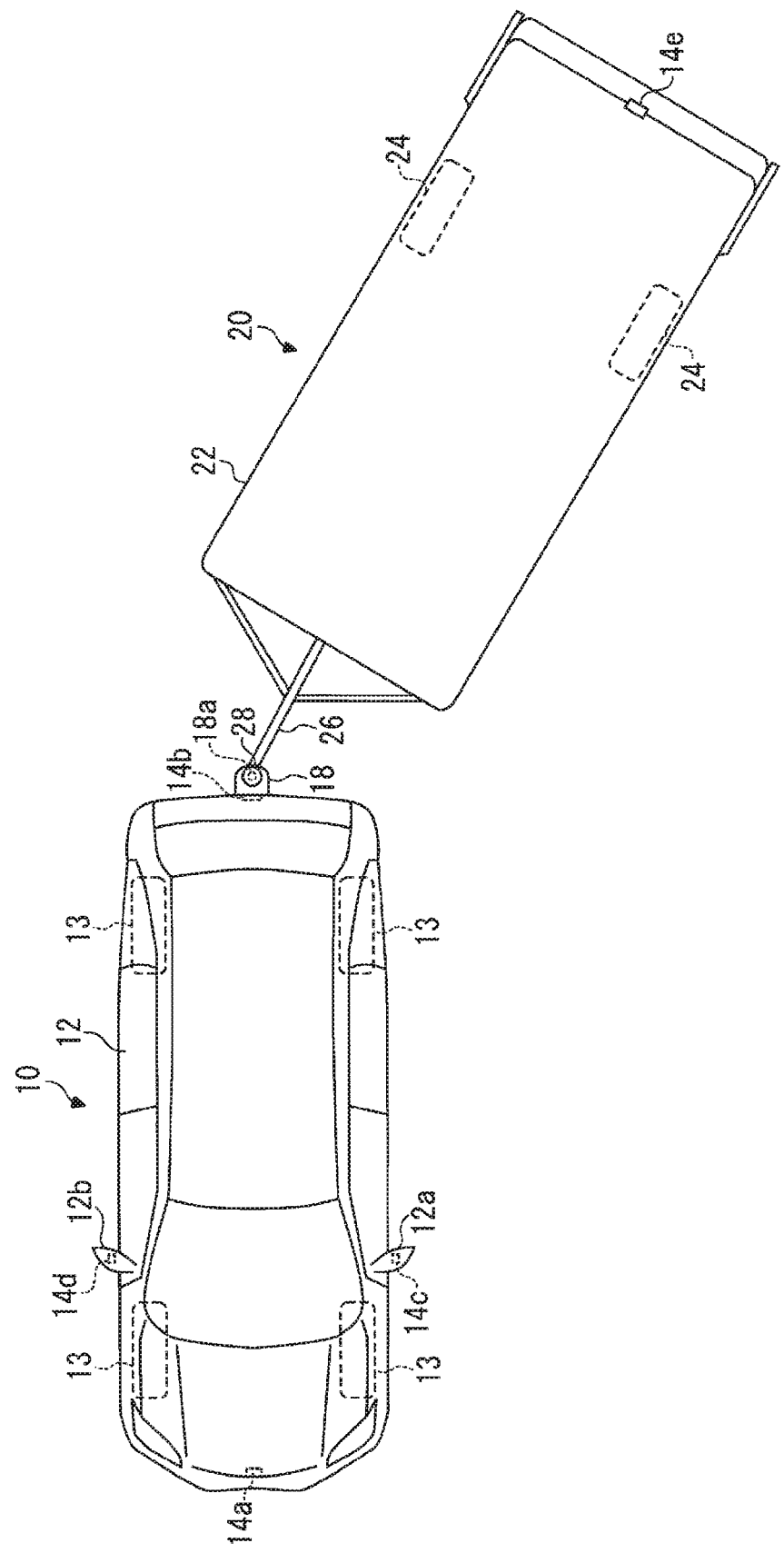
FIG. 1 is a plan view of a tow vehicle, on which a driving support device of an embodiment is mounted, and a towed vehicle.

FIG. 1 is a plan view of a tow vehicle 10, on which a driving support device of the embodiment is mounted, and a towed vehicle 20. The tow vehicle 10 is also called a tractor, and is configured to be capable of traveling while towing the towed vehicle 20. The tow vehicle 10 may be, for example, a car (for example, a hybrid car) having a drive source such as an internal combustion engine (for example, an engine) and an electric motor (for example, a motor). In addition, various transmission devices can be mounted on the tow vehicle 10, or various devices necessary for driving an internal combustion engine or an electric motor can be mounted on the tow vehicle. In addition, a method, a number, and a layout of a device related to driving of wheels 13 in the tow vehicle 10 can be variously set.

As illustrated in FIG. 1, the tow vehicle 10 includes a vehicle body 12, the four wheels 13, one or a plurality of (four, in the embodiment) imaging units 14a, 14b, 14c, and 14d, and a tow device 18. In a case where it is not necessary to differentiate between the imaging units 14a, 14b, 14c, and 14d, the imaging units will be referred to as imaging units 14.

The vehicle body 12 configures a passenger compartment where a passenger including a driver gets on. The vehicle body 12 accommodates or holds the wheels 13 and the imaging units 14 along with the driving support device to be described later.

The four wheels 13 are provided in the front, the rear, the left, and the right of the vehicle body 12. For example, the two wheels 13 on a front side function as steer wheels, and the two wheels 13 on a rear side function as drive wheels.

The imaging units 14 each are, for example, a digital camera in which an imaging element, such as a charge coupled device (CCD) and a CMOS image sensor (CIS), is built. The imaging units 14 output data of a moving image, including a plurality of frame images generated at a predetermined frame rate, or a still image as data of a captured image. Each of the imaging units 14 has a wide-angle lens or a fisheye lens, and can image, for example, a range of 140° to 190° in a horizontal direction. Optical axes of the imaging units 14 are set to face a diagonally downward direction. Therefore, the imaging units 14 output data of a captured image of the periphery of the tow vehicle 10 including a road surface.

The imaging units 14 are provided in the surroundings of the vehicle body 12. For example, the imaging unit 14a is provided in a middle portion of a front end portion of the vehicle body 12 in a right-and-left direction (for example, a front bumper). The imaging unit 14a generates a captured image of the periphery of the front of the tow vehicle 10. The imaging unit 14b is provided in a middle portion of a rear end portion of the vehicle body 12 in the right-and-left direction (for example, a rear bumper). The imaging unit 14b generates a captured image of the periphery of the rear of the tow vehicle 10. Specifically, the imaging unit 14b generates a captured image including a connecting member 26 that connects the towed vehicle 20. The imaging unit 14c is provided in a middle portion of a left end portion of the vehicle body 12 in the front-and-rear direction (for example, a left side mirror 12a). The imaging unit 14c generates a captured image of the periphery of the left of the tow vehicle 10. The imaging unit 14d is provided in a middle portion of a right end portion of the vehicle body 12 in the front-and-rear direction (for example, a right side mirror 12b). The imaging unit 14d generates a captured image of the periphery of the right of the tow vehicle 10.

The tow device 18 is a device that is also called a hitch. The tow device 18 is provided in a middle portion of the vehicle body 12 in the right-and-left direction. The tow device 18 protrudes from the rear end portion of the vehicle body 12 to the rear. The tow device 18 has, for example, a spherical hitch ball 18a provided in an upper end portion of a columnar member standing in a vertical direction.

The towed vehicle 20 is a vehicle that is also called a trailer and travels by being towed by the tow vehicle 10. The towed vehicle 20 includes a main body 22, a plurality of (two, in the embodiment) trailer wheels 24, the connecting member 26, a coupler 28, and an imaging unit 14e.

The main body 22 is formed, for example, in a rectangular box shape. The main body 22 is configured to be hollow so as to allow a cargo to be placed therein. The main body 22 may have a flat plate shape.

The trailer wheels 24 are provided on the right and the left of the main body 22 respectively. The trailer wheels 24 are, for example, coupled driving wheels. The trailer wheels 24 may be steer wheels which are steerable in the right-and-left direction by the drive wheels connected to a drive source, such as an engine, or a steering wheel.

The connecting member 26 is provided in a middle portion of the main body 22 in the right-and-left direction. The connecting member 26 extends from a front end portion of the main body 22 to the front.

The coupler 28 is provided in a front end portion of the connecting member 26. A spherical recessed portion covering the hitch ball 18a is formed in the coupler 28. By the coupler 28 covering the hitch ball 18a, the towed vehicle 20 is pivotably connected to the tow vehicle 10.

The imaging unit 14e may be the same digital camera as the imaging units 14. The imaging unit 14e is provided in a rear end portion and a middle portion in the right-and-left direction of the towed vehicle 20. The imaging unit 14e is provided to face the rear and the diagonally downward direction. The imaging unit 14e generates data of a captured image of the periphery including a road surface at the rear of the towed vehicle 20 and outputs the data.

Figure 2:
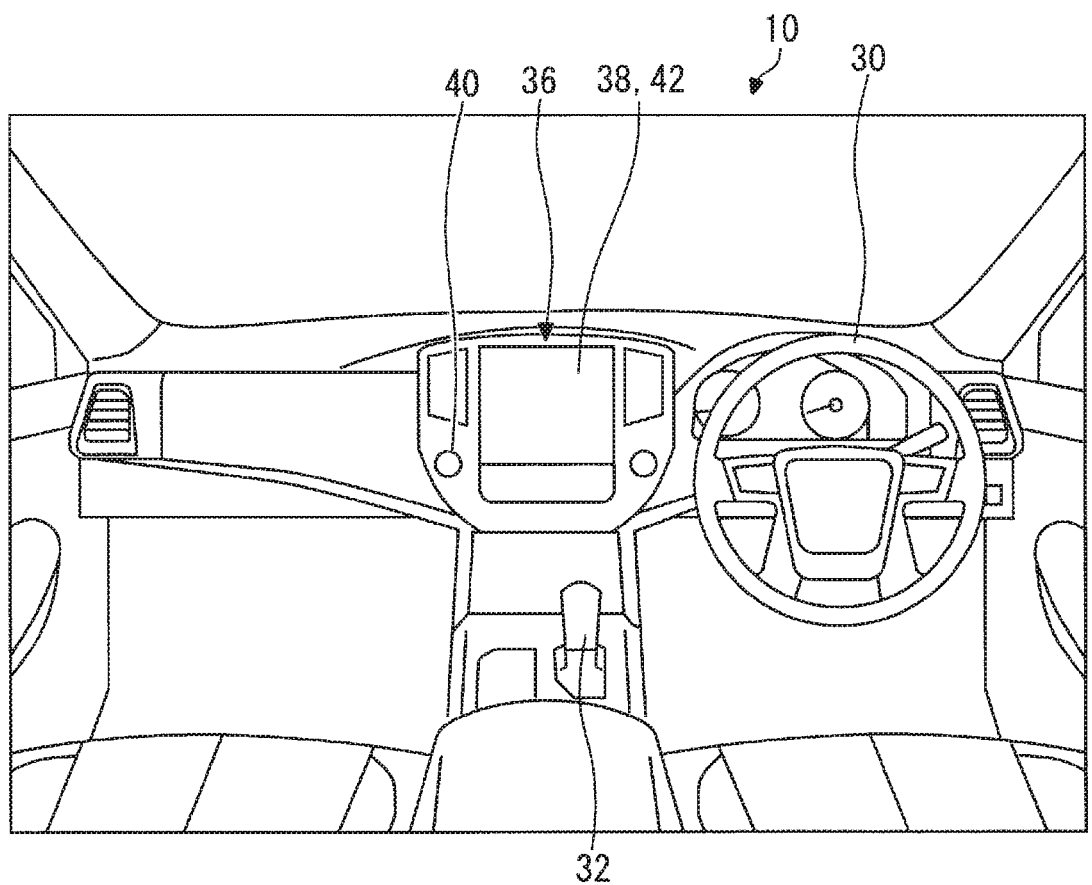
FIG. 2 is a view of a vicinity of a dashboard in a passenger compartment of the tow vehicle of the embodiment.

FIG. 2 is a view of a vicinity of a dashboard in the passenger compartment of the tow vehicle 10 of the embodiment. As illustrated in FIG. 2, the tow vehicle 10 further includes a steering unit 30, a transmission unit 32, and a monitor device 36.

The steering unit 30 is a device operated by a driver in order to steer the wheels 13 on the front side and change a traveling direction of the tow vehicle 10. The steering unit 30 is, for example, a steering wheel or a handle which protrudes from a center console and is provided in front of a driver's seat.

The transmission unit 32 is, for example, a device that includes a shift lever protruding from the center console and changes a transmission gear ratio of the tow vehicle 10 or the traveling direction of the tow vehicle 10 back and forth (driving, parking, and reversing).

The monitor device 36 is provided in the dashboard in the passenger compartment of the tow vehicle 10. The monitor device 36 has a display unit 38, a voice output unit 40, and an operation input unit 42.

The display unit 38 is, for example, a display device such as a liquid crystal display (LCD) and an organic electroluminescent display (OELD). The display unit 38 displays an image of route guidance and a display image for driving support in a navigation system.

The voice output unit 40 is, for example, a speaker. The voice output unit 40 outputs a voice guiding a driver in navigation.

The operation input unit 42 receives input by a passenger. The operation input unit 42 is, for example, a touch panel. The operation input unit 42 is provided on a display screen of the display unit 38. The operation input unit 42 is configured to be capable of transmitting an image displayed by the display unit 38. Accordingly, the operation input unit 42 enables the image displayed on the display screen of the display unit 38 to be seen by the passenger. The operation input unit 42 receives an instruction that is input by the passenger touching a position corresponding to the image displayed on the display screen of the display unit 38. For example, the operation input unit 42 receives, from the passenger, a target position, which is a destination of the tow vehicle 10, and a target angle that is a target of a hitch angle, which is an angle between the tow vehicle 10 and the towed vehicle 20, for driving support. The hitch angle in a state where the tow vehicle 10 and the towed vehicle 20 are arranged on a straight line is set to 0°. The operation input unit 42 may be a press button type hard switch, without being limited to the touch panel.

Figure 3:
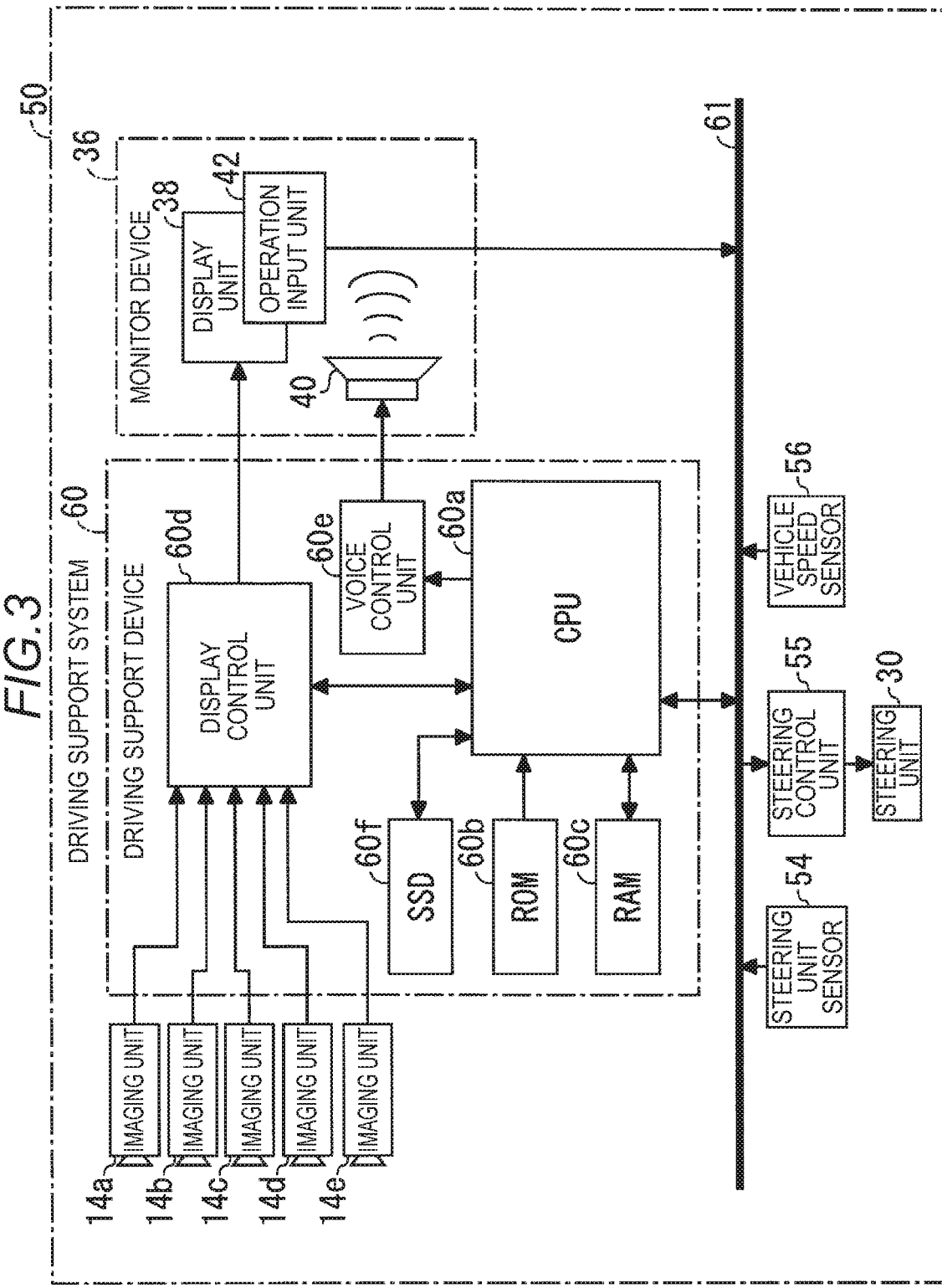
FIG. 3 is a block diagram of an overall configuration of a driving support system including the driving support device of the embodiment.

FIG. 3 is a block diagram of an overall configuration of a driving support system 50 including a driving support device 60 of the embodiment. The driving support system 50 is mounted on the tow vehicle 10, and causes the display unit 38 to display an image of the periphery of the tow vehicle 10 (hereinafter, a peripheral image), an image of the periphery seen from above, which is a virtual viewpoint (hereinafter, an overhead image), and a setting image for setting a target angle. The driving support device 60 supports driving of the tow vehicle 10 by controlling the steering unit 30 such that a hitch angle that is an angle between the tow vehicle 10, which tows the towed vehicle 20, and the towed vehicle 20 becomes a target angle set as a target.

As illustrated in FIG. 3, the driving support system 50 includes the plurality of imaging units 14a, 14b, 14c, 14d, and 14e, a steering unit sensor 54, a steering control unit 55, a vehicle speed sensor 56, the monitor device 36, the driving support device 60, and an in-vehicle network 61.

The plurality of imaging units 14 output captured images of the peripheries of the tow vehicle 10 and the towed vehicle 20 to the driving support device 60.

The steering unit sensor 54 is, for example, an angle sensor including a Hall effect element, and, in a case where the steering unit 30 is a handle, detects a rotation angle of the handle as a steering angle of the steering unit 30. The steering unit sensor 54 outputs information of the detected steering angle of the steering unit 30 to the in-vehicle network 61.

The steering control unit 55 is, for example, a computer including a microcomputer, such as an electronic control unit (ECU) having a hardware processor such as a central processing unit (CPU). The steering control unit 55 controls the steering unit 30 based on the steering angle instructed from the driving support device 60 and the steering angle of the steering unit 30 detected by the steering unit sensor 54.

The vehicle speed sensor 56 detects, for example, vehicle speed information for calculating a vehicle speed which is a speed of the tow vehicle 10. The vehicle speed sensor 56 detects, for example, the number of times of rotation of an output shaft of a transmission as vehicle speed information. The vehicle speed sensor 56 may detect the number of times of rotation of the wheels 13 and the number of times of rotation of an output shaft of a drive unit of the engine as vehicle speed information. The vehicle speed sensor 56 outputs the detected vehicle speed information to the in-vehicle network 61.

The driving support device 60 is a computer including a microcomputer such as an ECU. The driving support device 60 includes a CPU 60a, a read only memory (ROM) 60b, a random access memory (RAM) 60c, a display control unit 60d, a voice control unit 60e, and a solid state drive (SSD) 60f. The CPU 60a, the ROM 60b, and the RAM 60c may be accumulated in the same package.

The CPU 60a is an example of the hardware processor, and reads a program stored in a nonvolatile storage device such as the ROM 60b to execute various types of calculation processing and control in accordance with the program. The CPU 60a executes, for example, processing of driving support of the tow vehicle 10.

The ROM 60b stores a parameter necessary for each program and executing the program. The RAM 60c temporarily stores various types of data used in calculation by the CPU 60a. Out of various types of calculation processing by the driving support device 60, the display control unit 60d mainly executes image processing of captured images obtained from the imaging units 14 and data conversion of a display image displayed by the display unit 38, and outputs image information to the display unit 38. Out of various types of calculation processing by the driving support device 60, the voice control unit 60e mainly executes processing of outputting a voice to the voice output unit 40 and outputs voice data to the voice output unit 40. The SSD 60f is a rewriteable nonvolatile storage device, and maintains data even in a case where a power supply of the driving support device 60 is off.

The in-vehicle network 61 includes, for example, a controller area network (CAN) and a local interconnect network (LIN). The in-vehicle network 61 connects the steering unit sensor 54, the steering control unit 55, the vehicle speed sensor 56, the operation input unit 42 of the monitor device 36, and the driving support device 60 to one another such that information can be transmitted and received therebetween.

Figure 4:
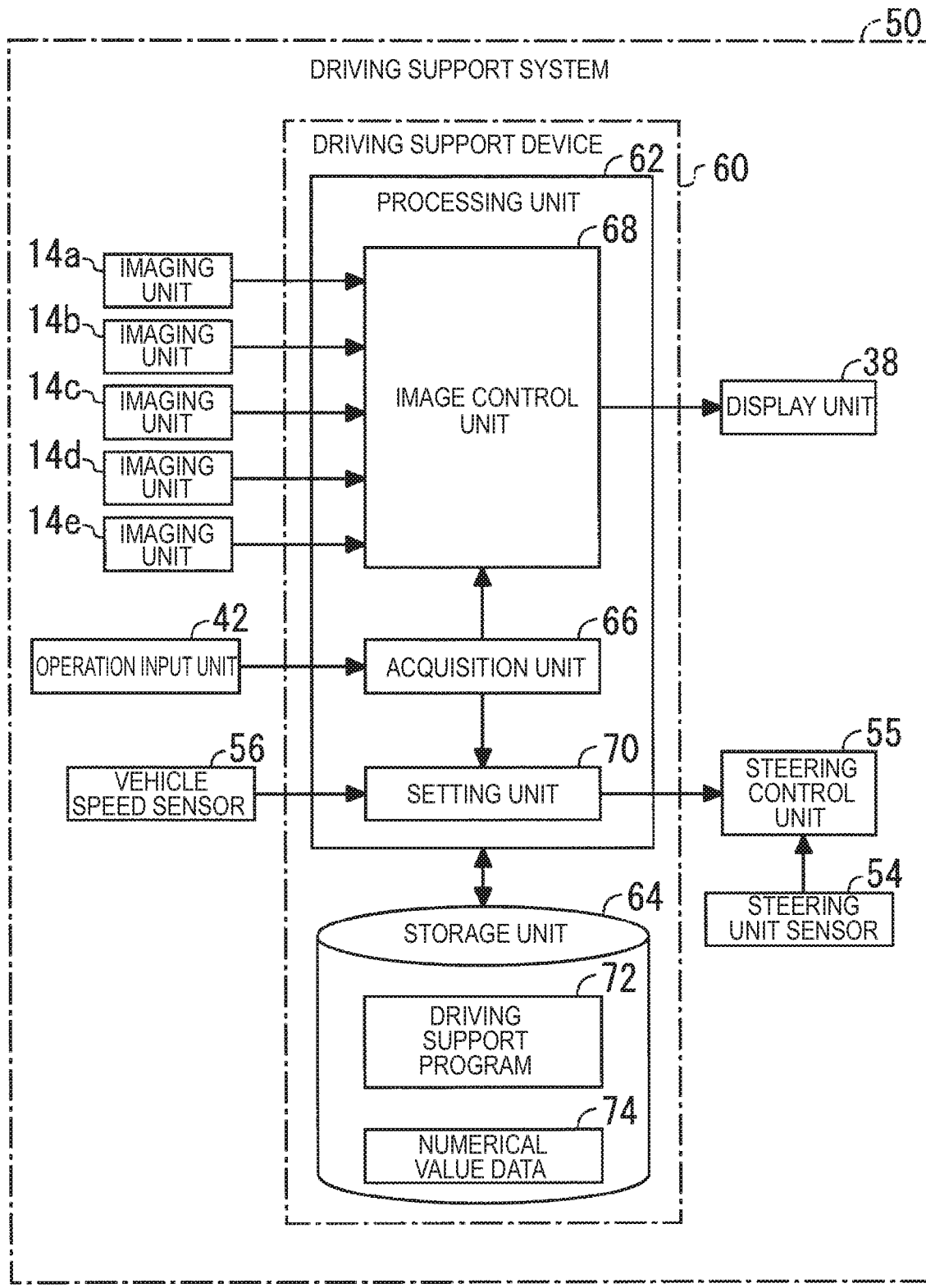
FIG. 4 is a functional block diagram showing a function of the driving support device.

FIG. 4 is a functional block diagram showing a function of the driving support device 60. As shown in FIG. 4, the driving support device 60 includes a processing unit 62 and a storage unit 64.

The processing unit 62 is realized as a function of the CPU 60a. The processing unit 62 realizes at least some functions of the driving support device 60 by hardware and software (driving support program 72) cooperating with each other. The processing unit 62 has functions of an acquisition unit 66, an image control unit 68, and a setting unit 70. The processing unit 62 may realize the functions of the acquisition unit 66, the image control unit 68, and the setting unit 70 by reading the driving support program 72 stored in the storage unit 64. Some or all of the acquisition unit 66, the image control unit 68, and the setting unit 70 may be configured by hardware such as a circuit including an application specific integrated circuit (ASIC) and a field-programmable gate array (FPGA).

The acquisition unit 66 acquires information input by a passenger via the operation input unit 42. For example, the acquisition unit 66 acquires input of a target position for guiding the tow vehicle 10 in automatic driving from the operation input unit 42. The acquisition unit 66 acquires input of a target angle at the time of backward movement of the tow vehicle 10 from the operation input unit 42 in a state where a setting image for setting a target angle is displayed by the display unit 38. The acquisition unit 66 outputs the acquired target position and the acquired target angle to the image control unit 68 and the setting unit 70.

The image control unit 68 generates a display image and causes the display unit 38 to display the display image. The image control unit 68 causes, for example, a display image including an overhead image, a peripheral image, and a setting image to be displayed. The image control unit 68 may display an image seen from above, which is a virtual viewpoint, as an overhead image based on captured images from the plurality of imaging units 14 of the tow vehicle 10 and the towed vehicle 20. The image control unit 68 may perform display of a peripheral image through display of one or two captured images, out of the captured images from the plurality of imaging units 14 provided in the tow vehicle 10 or the towed vehicle 20, in the mirror image state. The image control unit 68 may display, as a setting image, an image including a slider for inputting a target angle, the slider indicating a target angle input through the operation input unit 42. In a case of displaying a captured image from the imaging unit 14b as a peripheral image in the mirror image state, the image control unit 68 may superimpose a target image showing an indicator of a position to become a target of the connecting member 26, the indicator being a target indicator according to the input target angle, onto the peripheral image. In this case, the image control unit 68 may change the target indicator according to a target angle which is being input.

When backward movement of the tow vehicle 10 starts after the target angle is set, the image control unit 68 changes the captured image used as the peripheral image. For example, in a case of using display of the captured image from the imaging unit 14b in a rear portion of the tow vehicle 10 in the mirror image state as a peripheral image until backward movement starts, the image control unit 68 may display a peripheral image changed to display of a captured image from the imaging unit 14e of the towed vehicle 20 in the mirror image state when backward movement starts.

In a case where a prohibition condition for determining whether or not input of a target angle is prohibited is satisfied, the image control unit 68 may change a setting image to an image of a prohibited state, which shows that a target angle cannot be input (hereinafter, a prohibition image). For example, in a case where a vehicle speed is higher than a threshold speed, the image control unit 68 may set the setting image to the prohibition image, assuming that the prohibition condition is satisfied. In this case, the image control unit 68 may include an image showing a condition for canceling the prohibition image (for example, an image instructing speed reduction) into a display image. When a target position is input, the image control unit 68 may set the setting image to the prohibition image in which a target angle cannot be input.

The setting unit 70 causes the steering control unit 55 to control the steering unit 30. For example, the setting unit 70 causes the steering control unit to control the steering unit 30 such that the tow vehicle 10 is guided to a target position. The setting unit 70 acquires input of a target angle from the acquisition unit 66 and sets a target angle according to the input of the target angle. When the input of the target angle into the acquisition unit 66 by a passenger ends, the setting unit 70 maintains the target angle input from the operation input unit 42 until a predetermined determination condition is satisfied, and sets the target angle to a reference angle in a case where the predetermined determination condition is satisfied. For example, after the passenger separates a finger from the operation input unit 42 to end input of a target angle, the setting unit 70 maintains the target angle until the tow vehicle 10 stops. On the other hand, when the tow vehicle 10 stops, the setting unit 70 determines that the determination condition is satisfied, and changes the target angle to the reference angle determined in advance (for example, 0°). In a case where the passenger has input a new target angle while the target angle is maintained, the setting unit 70 may change the target angle to the new target angle. The setting unit 70 causes the steering control unit 55 to output a steering angle, which is calculated such that the hitch angle becomes the target angle, to control the steering unit 30. The setting unit 70 may detect the hitch angle based on the captured image from the imaging unit 14b, or may calculate the hitch angle by means of a sensor. In the embodiment, whether or not the tow vehicle 10 has stopped is used as a determination condition. Therefore, by continuing backward movement of the tow vehicle 10 after the passenger has set the target angle with the operation input unit 42, the setting unit 70 performs control such that the hitch angle between the tow vehicle 10 and the towed vehicle 20 becomes the target angle. After then, the setting unit 70 performs control of maintaining the target angle until the tow vehicle 10 stops unless operation is performed from the operation input unit 42. Then, the setting unit 70 sets the target angle to the reference angle (for example, 0°) simply by stopping the tow vehicle 10. Accordingly, after the stop, by the tow vehicle 10 continuing backward movement, the tow vehicle 10 and the towed vehicle 20 are automatically steered so as to be in the serial state. That is, since automatic steering can be realized such that the tow vehicle 10 and the towed vehicle 20 are brought into the serial state simply by stopping the tow vehicle 10, a burden of operation to the passenger can be reduced. Although an example in which whether or not the tow vehicle 10 has stopped is used as a determination condition is described in the embodiment, other determination conditions may be used.

The storage unit 64 is realized, for example, as at least one of functions of the ROM 60b, the RAM 60c, and the SSD 60f. The storage unit 64 is connected to the processing unit 62 such that information can be input and output. The storage unit 64 may be an external storage device connected via a network. The storage unit 64 stores data necessary for a program executed by the processing unit 62 and executing the program. For example, the storage unit 64 stores the driving support program 72 executed by the processing unit 62. The driving support program 72 may be provided by being stored in a computer readable storage medium, such as a compact disc read only memory (CD-ROM) and a digital versatile disc read only memory (DVD-ROM), or may be provided via a network such as the Internet. The storage unit 64 stores numerical value data 74 necessary for executing the driving support program 72. The numerical value data 74 may include a threshold speed. The storage unit 64 temporarily stores image data such as a captured image.

Figure 5:
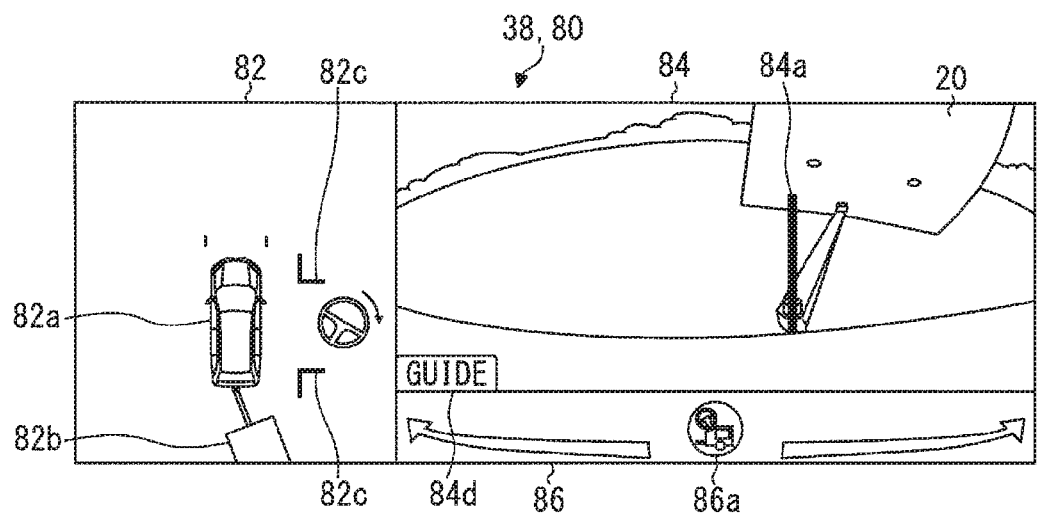
FIG. 5 is a view illustrating an example of a display image for reception, which receives input of a target position or a target angle.

FIG. 5 is a view illustrating an example of a display image 80 for reception, which receives input of a target position or a target angle. As illustrated in FIG. 5, the image control unit 68 causes the display unit 38 to display the display image 80 including an overhead image 82, a peripheral image 84, and a setting image 86. The image control unit 68 may dispose the overhead image 82 on the left, dispose the peripheral image 84 on the upper right, and dispose the setting image 86 on the lower right, in the display image 80. The disposition of the images may be changed as appropriate.

The image control unit 68 may generate an image of a periphery including the tow vehicle 10 that is seen from above, which is a virtual viewpoint, as the overhead image 82 based on captured images from the imaging units 14a, 14b, 14c, and 14d of the tow vehicle 10. The image control unit 68 may superimpose vehicle images 82a and 82b, which show positions of the tow vehicle 10 and the towed vehicle 20 in the overhead image 82, onto the overhead image 82. The image control unit 68 may superimpose a parking position image 82c showing a position where the tow vehicle 10 can be parked onto the overhead image 82 in a case of receiving input of a target position from a passenger. When the passenger touches the parking position image 82c, the acquisition unit 66 acquires the parking position image 82c as a target position and outputs the parking position image to the setting unit 70.

When acquiring input of a target position or a target angle, the image control unit 68 causes the display unit 38 to display the captured image obtained by the imaging unit 14b in the rear portion of the tow vehicle 10 in the mirror image state as the peripheral image 84, along with the setting image 86. In this case, mirror images of the towed vehicle 20 and the connecting member 26 are included in the peripheral image 84. The image control unit 68 may superimpose a target indicator 84*a* according to a target angle which is being input onto the peripheral image 84. Since the target angle is set to the reference angle until input of a target angle is received, the image control unit 68 may superimpose the target indicator 84*a* having a straight line shape according to the reference angle onto the peripheral image 84. In this case, the image control unit 68 may display the target indicator 84*a* along an up-and-down direction as illustrated in FIG. 5. The image control unit 68 may superimpose a guide button 84*d* for inputting a driving support instruction onto the peripheral image 84.

The image control unit 68 may display, along with arrows, an image including a slider 86*a* as the setting image 86 for setting a target angle which is a target of the hitch angle. First, the image control unit 68 may dispose the slider 86*a* at a position according to the reference angle. In a case where the reference angle is 0°, the image control unit 68 may dispose the slider 86*a* in the middle. The image control unit 68 may set a horizontal length of the setting image 86, that is, a length over which the slider 86*a* is movable according to a maximum value of the hitch angle. For example, the image control unit 68 may set the length over which the slider 86*a* is movable to approximately 70% of the maximum value of the hitch angle for jackknifing prevention. The maximum value of the hitch angle may be calculated from geometry calculation in which dimension information of the tow vehicle 10, including a width, a length, and a wheel base, a length of the towed vehicle 20, and a maximum value of a tire angle of the towed vehicle are used. The image control unit 68 of the embodiment displays a captured image in the peripheral image 84 in the mirror image state, and displays the slider 86*a* on a lower side of the peripheral image 84. For this reason, a driver can set a target angle by means of the slider 86*a* while checking the current state of the towed vehicle 20 through the mirror image of the captured image. For example, even in case where a captured image obtained by the imaging unit 14*b* provided in the rear portion of the tow vehicle 10 is displayed, the captured image is displayed in the mirror image state. Therefore, the right-and-left direction where the towed vehicle 20 is movable, which is displayed in the peripheral image 84, can be made to match a right-and-left direction of the slider 86*a*. Accordingly, the driver can set a target angle intuitively.

Figure 6:
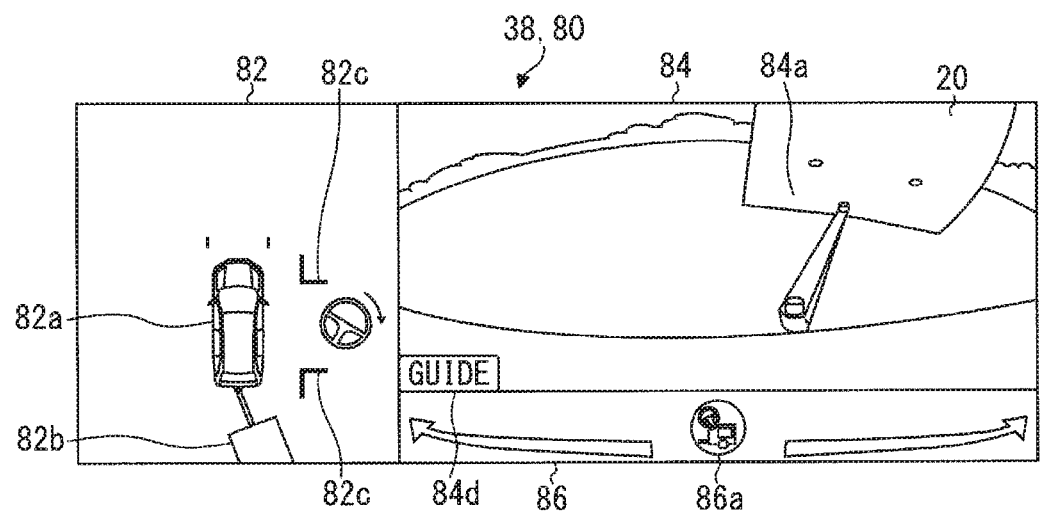
FIG. 6 is a view illustrating another example of the display image for reception, which receives the input of the target position or the target angle.

FIG. 6 is a view illustrating another example of the display image 80 for reception, which receives input of a target position or a target angle. As illustrated in FIG. 6, the image control unit 68 causes the display unit 38 to display the display image 80 including the overhead image 82, the peripheral image 84, and the setting image 86. The disposition of the images may be changed as appropriate. In this state, the image control unit 68 may not display the target indicator 84*a* according to the slider 86*a*.

Figure 7:
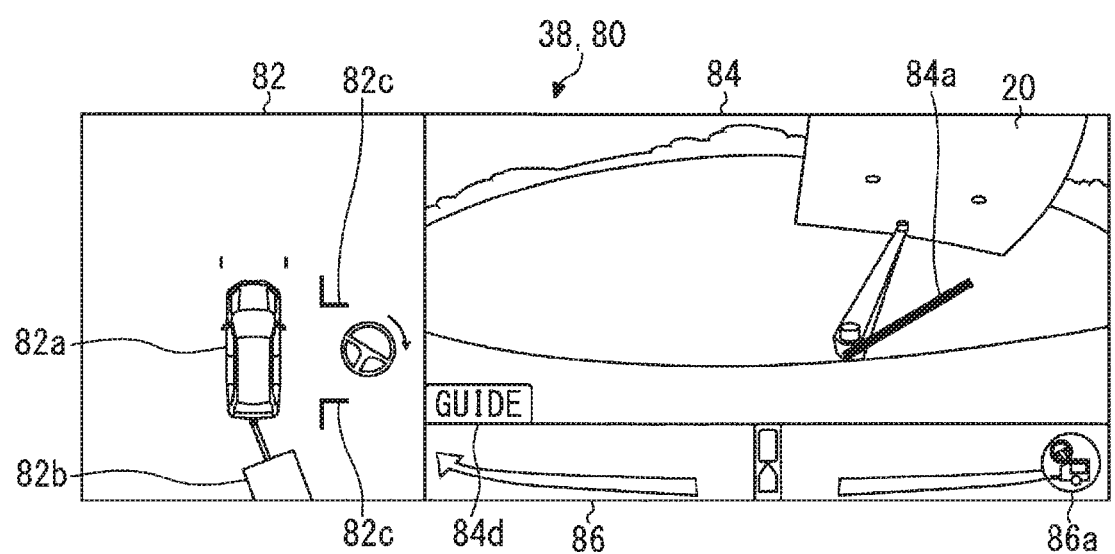
FIG. 7 is a view illustrating an example of a display image in which the target angle is being input.

FIG. 7 is a view illustrating an example of the display image 80 in which a target angle is being input. For example, when a passenger moves a finger, which has touched the slider 86*a*, in any horizontal direction on the operation input unit 42, the image control unit 68 moves the slider 86*a* according to the movement of the finger. Accordingly, the acquisition unit 66 acquires input of a target angle and outputs the target angle to the setting unit 70, and the setting unit 70 sets a target angle according to the input. For example, in a case where the acquisition unit 66 has received slide operation of the slider 86*a* to the right of the horizontal direction as illustrated in FIG. 7, the setting unit 70 sets a target angle for moving the towed vehicle 20 to the left in a case where the rear is seen from the tow vehicle 10. In other words, when the passenger moves the slider 86*a* to the right, the setting unit 70 sets a target angle for moving the towed vehicle 20 to the right. In a case where the acquisition unit 66 has received slide operation of the slider 86*a* to the left of the horizontal direction, the setting unit 70 sets a target angle for moving the towed vehicle 20 to the right in a case where the rear is seen from the tow vehicle 10. In other words, when the passenger moves the slider 86*a* to the left, the setting unit 70 sets a target angle for moving the towed vehicle 20 to the left.

The image control unit 68 rotates an upper end of the target indicator 84*a* about a lower end of the target indicator 84*a* of the peripheral image 84 according to a position of the slider 86*a*, that is, a target angle. After then, even when a passenger separates a finger from the operation input unit 42, the image control unit 68 fixes the slider 86*a* at a position where the finger is separated, and the setting unit 70 maintains setting of a target angle corresponding to the position of the slider 86*a*. During backward movement of the tow vehicle 10, the image control unit 68 displays one of a captured image obtained by the imaging unit 14*b* provided in the rear portion of the tow vehicle 10, captured images obtained by the imaging units 14*c* and 14*d* provided in side portions of the tow vehicle 10, and a captured image obtained by the imaging unit 14*e* provided in a rear portion of the towed vehicle 20 as the peripheral image 84. Captured image selection means may be any method, may be operated by a driver, or may be setting by the setting unit 70.

Figure 8:
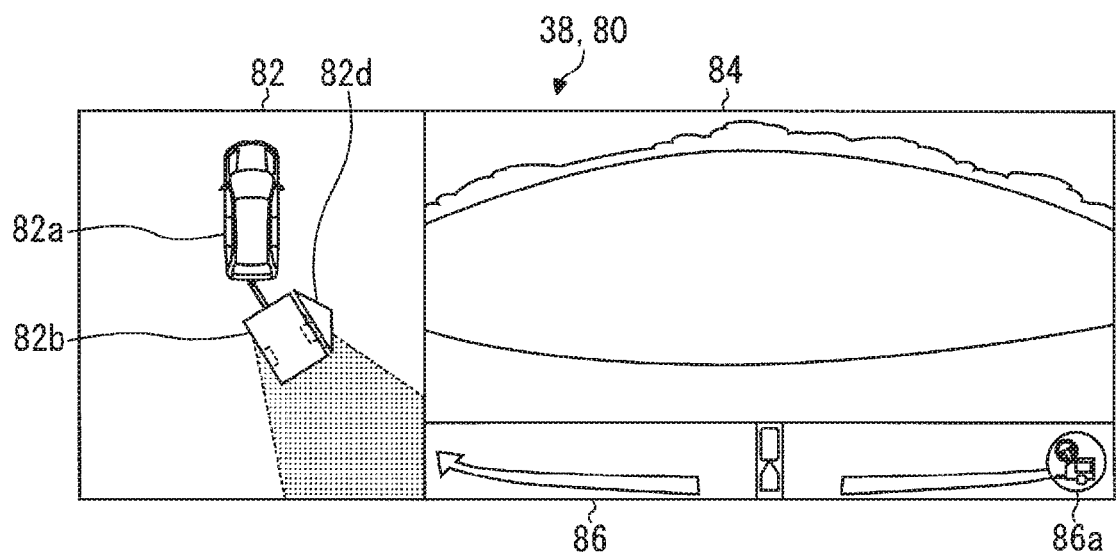
FIG. 8 is a view illustrating an example of the display image during backward movement while controlling a steering unit according to the target angle.

FIG. 8 is a view illustrating an example of the display image 80 during backward movement while controlling the steering unit 30 according to a target angle. As illustrated in FIG. 8, the image control unit 68 may display, during control of the steering unit 30, the overhead image 82 in which the vehicle image 82*a* of the tow vehicle 10 is disposed higher than a position at the time of reception of a target angle. Accordingly, the image control unit 68 can provide the overhead image 82 of which an image region of the rear, which is the traveling direction of the tow vehicle 10, is increased. Herein, the image control unit 68 may dispose the vehicle image 82*b* of the towed vehicle 20 in the overhead image 82 in a direction according to a target angle, or may dispose the vehicle image in a direction according to an actual position of the towed vehicle 20. The image control unit 68 may superimpose a direction image 82*d* showing a direction of a target angle onto the overhead image 82. In an example illustrated in FIG. 8, since the slider 86*a* is moved to the right, the image control unit 68 displays the direction image 82*d* on the right of the towed vehicle 20. During backward movement, the image control unit 68 causes display of a captured image from the imaging unit 14*e* of the towed vehicle 20 to be displayed in the mirror image state as the peripheral image 84. Accordingly, the image control unit 68 can provide a passenger with an image in a traveling direction of the towed vehicle 20 as the peripheral image 84.

Figure 9:
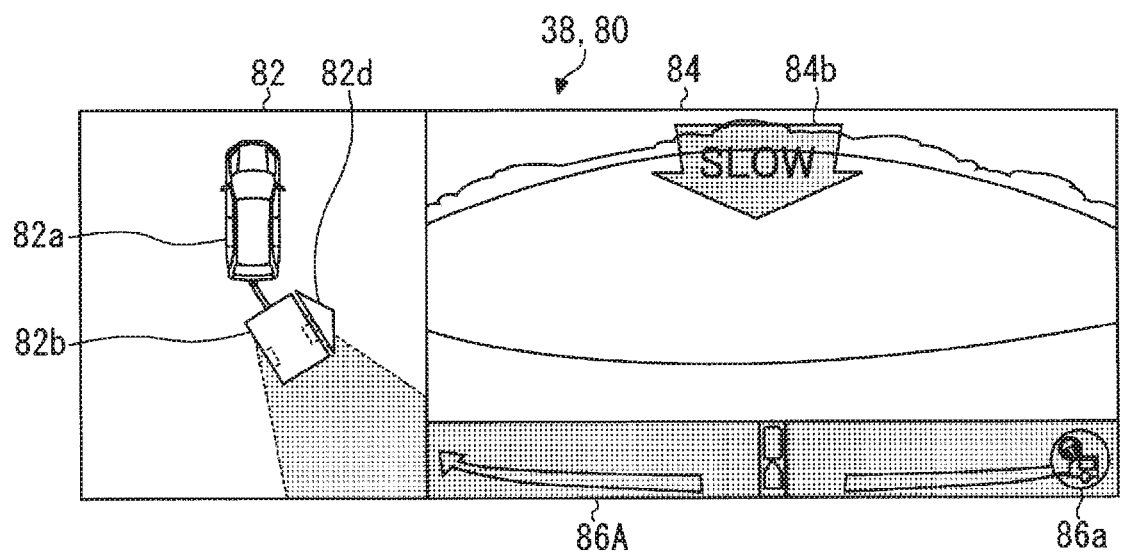
FIG. 9 is a view illustrating an example of the display image in which the input of the target angle is prohibited.

FIG. 9 is a view illustrating an example of the display image 80 in which input of a target angle is prohibited. As illustrated in FIG. 9, in a case of prohibiting input of a target angle, the image control unit 68 may change display of the setting image 86 to a prohibition image 86A showing an input prohibited state. The prohibition image 86A may be, for example, an image obtained by lowering the brightness of the setting image 86 or a translucent image obtained by applying dark color (for example, gray), of which transmittance is set, to the setting image 86. During automatic driving in which the steering unit 30 is controlled in order to guide to a target position, the image control unit 68 may switch display of the setting image 86 to the prohibition image 86A. When a prohibition condition determined in advance is satisfied while the steering unit 30 is being controlled such that the hitch angle becomes a target angle, the image control unit 68 may switch from the setting image 86 to the prohibition image 86A. For example, when the vehicle speed of the tow vehicle 10 becomes higher than a threshold vehicle speed, the image control unit 68 may switch the setting image 86 to the prohibition image 86A, assuming that the prohibition condition is satisfied. The threshold vehicle speed is a speed determined in advance (for example, several km per hour), and may be stored in the storage unit 64 as part of the numerical value data 74. In this case, the image control unit 68 may display an instruction image 84*b* for canceling the prohibition condition in the display image 80. In an example illustrated in FIG. 9, the image control unit 68 displays the instruction image 84*b* to instruct speed reduction in the peripheral image 84.

Figure 10:
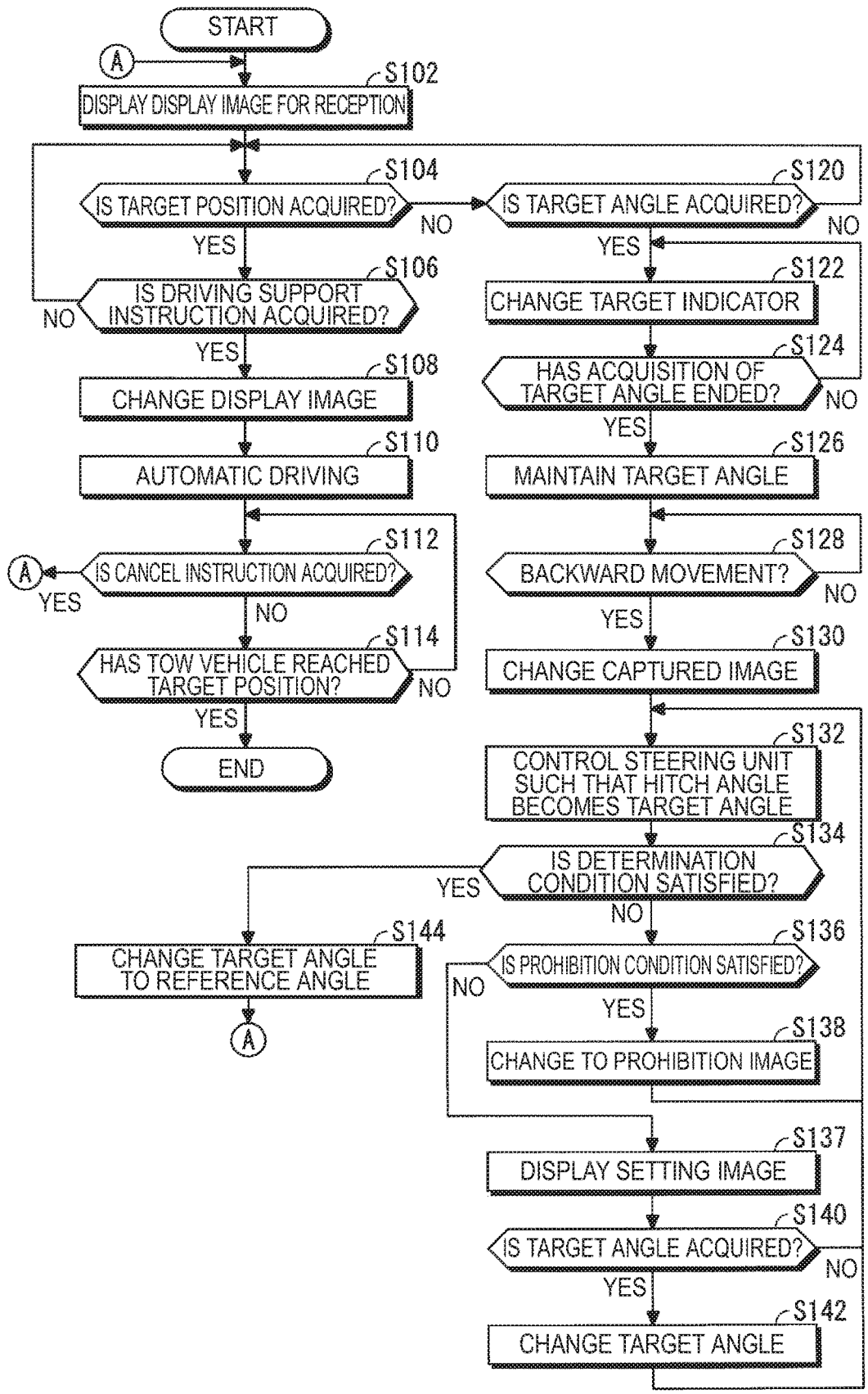
FIG. 10 is a flow chart of driving support processing of a first embodiment, which is executed by a processing unit.

FIG. 10 is a flow chart of driving support processing of the first embodiment, which is executed by the processing unit 62. As shown in FIG. 10, in the driving support processing, the image control unit 68 causes the display unit 38 to display the overhead image 82, a mirror image of a captured image of the rear of the tow vehicle 10, which is obtained by the imaging unit 14*b*, and the display image 80 for reception including the setting image 86 illustrated in FIG. 5 (S102).

The acquisition unit 66 determines whether or not a target position is acquired (S104). When it is determined that the target position is acquired (S104: Yes), the acquisition unit 66 determines whether or not a driving support instruction is acquired (S106). In a case where the driving support instruction is not acquired (S106: No), the acquisition unit 66 repeats processing subsequent to Step S104. When a passenger touches the guide button 84*d*, or when the passenger starts backward movement, the acquisition unit 66 determines that the driving support instruction is acquired (S106: Yes), and the image control unit 68 switches the display image 80 for reception of the display unit 38 to the display image 80 including the prohibition image 86A in which input of a target angle is prohibited as illustrated in FIG. 9 (S108). The image control unit 68 may switch to the overhead image 82 which is mainly about the tow vehicle 10, along with the prohibition image 86A. The setting unit 70 causes the steering control unit 55 to start automatic driving to the target position (S110). Accordingly, the steering control unit 55 controls the steering unit 30 to cause the tow vehicle 10 to be driven automatically.

The acquisition unit 66 determines whether or not a cancel instruction of automatic driving to the target position is acquired (S112). In a case where the passenger has operated a cancel button, the acquisition unit 66 determines that the cancel instruction is acquired (S112: Yes), and repeats Step S102 (refer to A in a circle). In a case where the acquisition unit 66 has not acquired the cancel instruction (S112: No), the setting unit 70 determines whether or not the tow vehicle 10 has reached the target position (S114). Until the tow vehicle 10 reaches the target position (S114: No), the setting unit 70 repeats processing subsequent to Step S113 while automatic driving is being continued. When the setting unit 70 determines that the tow vehicle 10 has reached the target position (S114: Yes), the driving support device 60 ends the driving support processing.

When it is determined that the target position is not acquired in a state where the display image 80 for reception is displayed (S104: No), the acquisition unit 66 determines whether or not a target angle is acquired (S120). When it is determined that the target angle is not acquired (S120: No), the acquisition unit 66 repeats Step S104. When it is determined that the target angle is acquired (S120: Yes), the acquisition unit 66 outputs the target angle to the image control unit 68. When the target angle is acquired, the image control unit 68 changes, according to the target angle, the position of the slider 86*a* of the setting image 86 included in the display image 80 for reception and a direction of the target indicator 84*a* on the peripheral image 84 as illustrated in FIG. 7 (S122).

The acquisition unit 66 determines whether or not acquisition of the target angle has ended (S124). While the passenger continues operation of the slider 86*a* and the acquisition unit 66 determines that the acquisition of the target angle has not ended (S124: No), the image control unit 68 changes, by repeating Step S122, the position of the slider 86*a* and the direction of the target indicator 84*a* according to a change in the target angle which is being acquired.

When the passenger separates the finger from the operation input unit 42 to end the operation of the slider 86*a*, the acquisition unit 66 determines that the acquisition of the target angle has ended (S124: Yes), and outputs the acquired target angle to the setting unit 70. The setting unit 70 maintains the target angle which is set according to input of the target angle (S126).

The setting unit 70 determines whether or not the tow vehicle 10 has started backward movement (S128). The setting unit 70 is in a standby state until the tow vehicle 10 moves backward (S128: No). For example, when the passenger reverses the transmission unit 32 and accelerates the tow vehicle 10, the setting unit 70 determines that the tow vehicle 10 has started backward movement (S128: Yes), and the image control unit 68 changes a captured image which is displayed in a mirror image state in the peripheral image 84 (S130). Specifically, the image control unit 68 changes from the captured image from the imaging unit 14*b* to the captured image of the imaging unit 14*e* as illustrated in FIG. 8.

The setting unit 70 outputs a steering angle, which is a target angle, to the steering control unit 55 and causes the steering control unit 55 to control the steering unit 30 such that the hitch angle becomes the target angle (S132). The setting unit 70 determines whether or not the determination condition is satisfied (S134). For example, in a case where the tow vehicle 10 continues backward movement and is not stopped, the setting unit 70 determines that the determination condition is not satisfied (S134: No), and the image control unit 68 determines whether or not the prohibition condition is satisfied (S136). For example, if the speed of the tow vehicle 10 is equal to or higher than the threshold speed, the image control unit 68 determines that the prohibition condition is satisfied (S136: Yes), causes the display unit 38 to display the prohibition image 86A in which reception of the target angle is prohibited (S138), and repeats processing subsequent to Step S132.

When the image control unit 68 determines that the prohibition condition is not satisfied (S136: No), display of the setting image 86 is continued or display of the setting image 86 is switched (S137). The acquisition unit 66 determines whether or not a new target angle is acquired (S140). When the acquisition unit 66 determines that the new target angle is not acquired (S140: No), the setting unit 70 repeats processing subsequent to Step S132 and maintains the hitch angle as a target angle. When it is determined that the target angle is acquired (S140: Yes), the acquisition unit 66 outputs the new target angle to the setting unit 70. The setting unit 70 changes the target angle to the new target angle (S142), and repeats processing subsequent to Step S132.

When the tow vehicle 10 stops, the setting unit 70 determines that the determination condition is satisfied (S134: Yes), and changes the target angle to the reference angle (S144). Then, the image control unit 68 executes processing subsequent to Step S102 (refer to A in a circle).

As described above, the driving support device 60 acquires a target angle from a passenger including a driver via the setting image 86 in a state where the peripheral image 84 including a mirror image obtained by bringing captured images from the imaging units 14 into a mirror image state and the setting image 86 including the slider 86a are displayed. Accordingly, the driving support device 60 can make an operation direction of the slider 86a to match a backward movement direction of the towed vehicle 20. As a result, the driving support device 60 can provide the passenger with an environment where a target angle can be set while checking a direction where steering of the towed vehicle 20 can be controlled.

Even after a passenger separates a finger from the operation input unit 42 to end operation input of a target angle, the driving support device 60 maintains the acquired target angle until the determination condition is satisfied. Accordingly, the driving support device 60 omits continuation of operation for maintaining the target angle by the passenger using the operation input unit 42, and thus the finger of the passenger inputting the target angle can be brought into a free state. As a result, the driving support device 60 can provide the passenger with an environment where the hitch angle according to a target angle can be easily maintained while further improving operability.

For example, in a case where the slider 86a is operated to the left, the driving support device 60 correlates a mirror image of a captured image with the operation direction of the slider 86a such that the towed vehicle 20 comes to the right of the tow vehicle 10 in a case of seen from the rear. Accordingly, a passenger checks a mirror image of a captured image while performing slide operation onto the slider 86a in a direction, to which the towed vehicle 20 checked through the mirror image is intended to be moved. Therefore, the passenger can adjust a target angle as desired, and thus the driving support device 60 can realize intuitive operation.

When the tow vehicle 10, which is moving backward, stops, the driving support device 60 sets a target angle to the reference angle, assuming that the determination condition is satisfied. Accordingly, the driving support device 60 can return the maintained target angle to the reference angle through stopping without requiring the passenger to perform new operation such as reset.

When the prohibition condition is satisfied, the driving support device 60 displays the prohibition image 86A in which input of a target angle is prohibited. Accordingly, the driving support device 60 can notify a passenger that a target angle cannot be input.

When acquiring a target angle, the driving support device 60 displays a captured image including the connecting member 26 of the towed vehicle 20, which is obtained by the imaging unit 14b. Thus, the driving support device allows a passenger to set a target angle while showing an angle of the connecting member 26, that is, the hitch angle.

The driving support device 60 may superimpose the target indicator 84a, according to a target angle which is being input, onto the peripheral image 84 including a mirror image of the captured image. Accordingly, the driving support device 60 can notify a passenger of which direction the towed vehicle 20 should face with respect to the tow vehicle 10 according to a target angle which is being input.

The driving support device 60 displays a mirror image of a captured image obtained by the imaging unit 14e provided in the towed vehicle 20, for example, while controlling the steering unit 30 such that a target angle is realized, which is during backward movement. Accordingly, the driving support device 60 can provide a passenger with a state of the backward movement direction of the towed vehicle 20 through an image.

After the target position is acquired, the driving support device 60 displays the prohibition image 86A in which input of a target angle is prohibited, during automatic driving of guiding to a target position. Accordingly, when the target position is input, the driving support device 60 can notify a passenger that it is unnecessary to input a target angle.

Second Embodiment

A second embodiment, in which a peripheral image that is displayed while controlling the steering unit such that a target angle is realized is changed, will be described. Since each configuration of the second embodiment is different from the first embodiment only in terms of a function and content of processing, description will be made by using the same reference signs.

When the tow vehicle 10 starts backward movement after acquiring a target angle, the image control unit 68 of the second embodiment causes the display unit 38 to perform display of a pair of captured images of a pair of imaging units 14c and 14d provided on both of the right and the left of the tow vehicle 10 in the mirror image state as the peripheral image 84.

Figure 11:
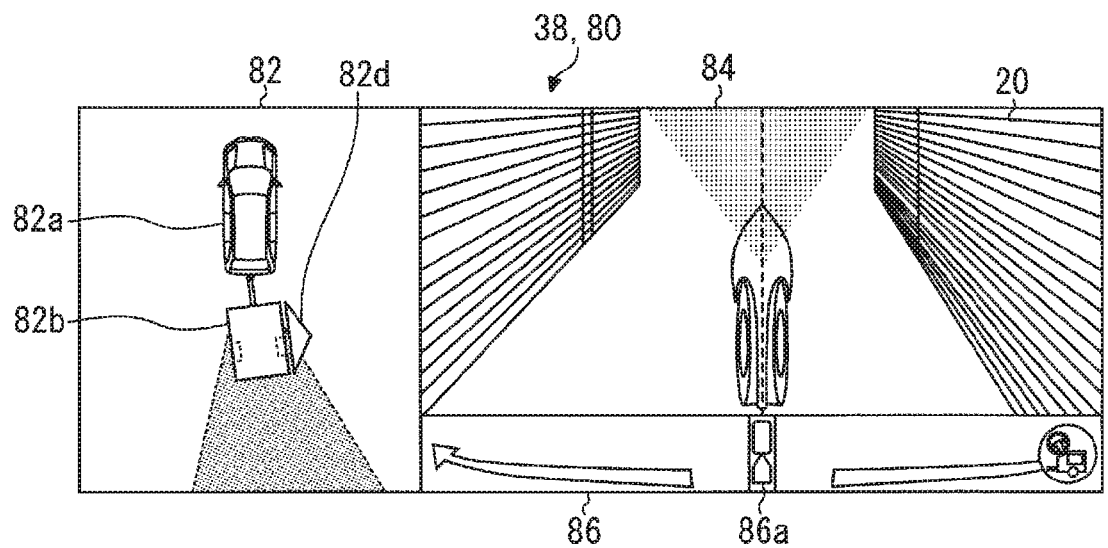
FIG. 11 is a view illustrating a display image of a second embodiment.

FIG. 11 is a view illustrating the display image 80 of the second embodiment. As illustrated in FIG. 11, the image control unit 68 disposes a mirror image of a captured image obtained by the imaging unit 14c on the left of the tow vehicle 10 onto the left of the peripheral image 84, and disposes a mirror image of a captured image obtained by the imaging unit 14d on the right onto the right of the peripheral image 84. In other words, the image control unit 68 connects the mirror images of the captured images on the right and the left to generate one peripheral image 84.

Figure 12:
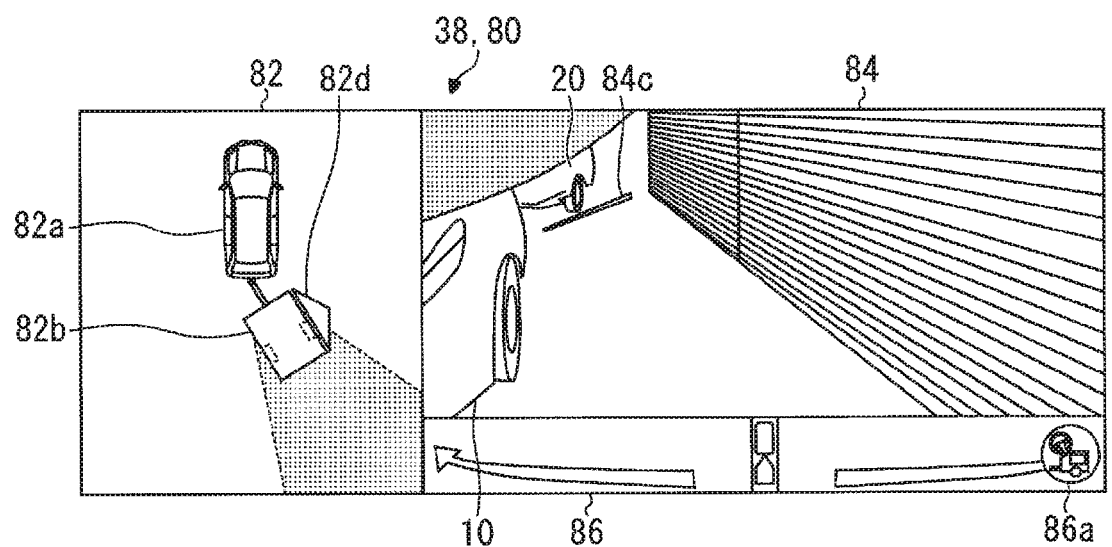
FIG. 12 is a view illustrating the display image in a case where a hitch angle is large in the second embodiment.

FIG. 12 is a view illustrating the display image 80 in a case where the hitch angle is large in the second embodiment. When the hitch angle is larger than a first threshold angle as illustrated in FIG. 12, the image control unit 68 may cause the display unit 38 to display, as the peripheral image 84, a mirror image of a captured image from the imaging unit 14e on a side where the towed vehicle 20 currently exists. In other words, the image control unit 68 may display a mirror image of a captured image, in which a towed vehicle 20 side is large, as the peripheral image 84. The image control unit 68 may detect the hitch angle, for example, based on a captured image from the imaging unit 14b in the rear portion. The first threshold angle is an angle determined in advance, and may be, for example, several tens of °. The first threshold angle may be stored in the storage unit 64 as part of the numerical value data 74. The image control unit 68 may further superimpose a direction line 84c along the traveling direction of the towed vehicle 20 onto the peripheral image 84 in which the captured image from the imaging unit 14e on the towed vehicle 20 side is displayed in the mirror image state. The direction line 84c may be a solid line, a dashed line, and a dotted line, or may be a line penetrating the background. The direction line 84c of the towed vehicle 20 is displayed as a line indicating a traveling direction at the time of backward movement of the towed vehicle 20 based on the current hitch angle between the tow vehicle 10 and the towed vehicle 20. In the embodiment, it becomes easy to understand a positional relationship between an object existing on the periphery and the towed vehicle 20 by displaying the direction line 84c. An example in which the direction line 84c is displayed on the peripheral image 84 is described in the embodiment. However, the direction line may be displayed as a traveling direction at the time of backward movement of the towed vehicle 20 on the overhead image 82, instead of a line that limits display on the peripheral image 84.

Figure 13:
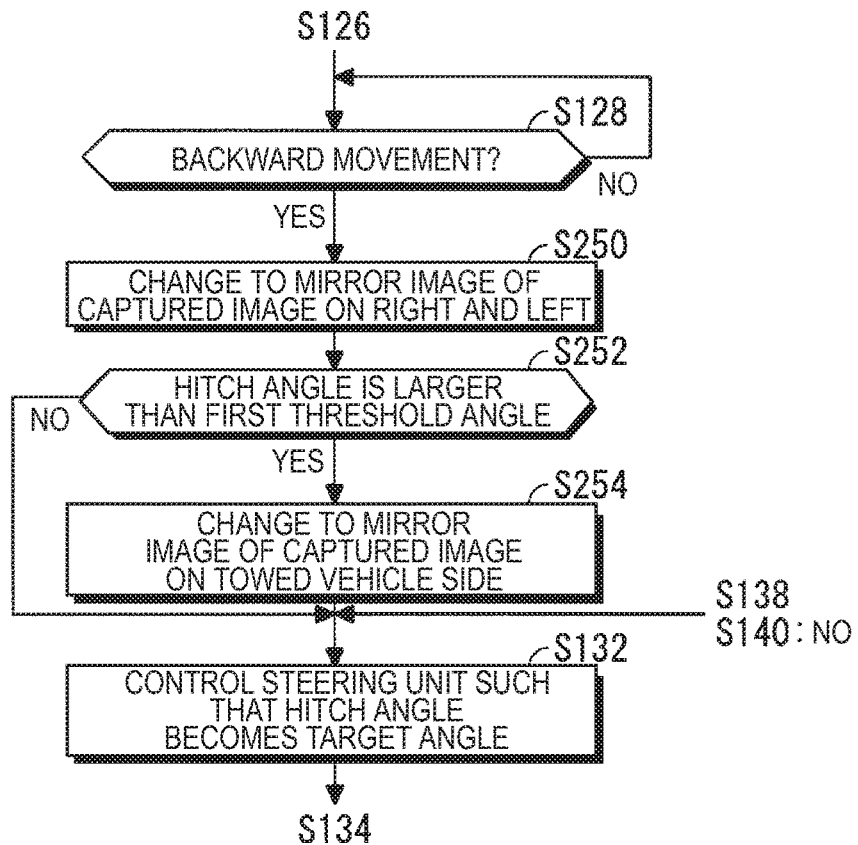
FIG. 13 is a part of a flow chart of driving support processing of the second embodiment, which is executed by a processing unit.

FIG. 13 is a part of a flow chart of driving support processing of the second embodiment, which is executed by the processing unit 62. Out of various types of driving support processing of the second embodiment, a portion different from the first embodiment will be mainly described, and some description will be omitted.

As shown in FIG. 13, in the second embodiment, when the setting unit 70 maintains a target angle (S126) and determines that the tow vehicle 10 has started backward movement (S128: Yes), the image control unit 68 changes the peripheral image 84 from a mirror image of a captured image from the imaging unit 14b in the rear portion to mirror images of captured images from the imaging units 14c and 14d on the right and the left as illustrated in FIG. 11 (S250).

The image control unit 68 determines whether or not the hitch angle is larger than the first threshold angle (S252). In a case where the hitch angle is equal to or smaller than the first threshold angle (S252: No), the image control unit 68 executes processing subsequent to Step S132. When the hitch angle is larger than the first threshold angle (S252: Yes), the image control unit 68 changes the mirror image of the captured image in the peripheral image 84 to the mirror image of the captured image from the imaging unit 14e on the towed vehicle 20 side as illustrated in FIG. 12 (S254). At this time, the image control unit 68 superimposes the direction line 84c along the traveling direction of the towed vehicle 20 onto a vicinity of the towed vehicle 20 imaged in the peripheral image 84. After then, the setting unit 70 executes processing subsequent to Step S132.

Since the mirror images of the captured images from the pair of imaging units 14c and 14d on the right and the left of the tow vehicle 10 are displayed as the peripheral image 84, the driving support device 60 of the second embodiment can provide a passenger with the peripheral image 84 having a wide area including the rear and the rear right and left of the tow vehicle 10.

When the hitch angle is larger than the first threshold angle, the driving support device 60 provides a passenger with an image, in which the towed vehicle 20 is captured in a large size by the imaging unit 14 on the towed vehicle 20 side, as the peripheral image 84. Accordingly, when the hitch angle is large, the driving support device 60 can provide the passenger with a state of the towed vehicle 20 through a clearer image.

The driving support device 60 causes the display unit 38 to display an image obtained by superimposing the direction line along the traveling direction of the towed vehicle 20 onto the mirror image of the captured image from the imaging unit 14 on the towed vehicle 20 side. Accordingly, the driving support device 60 can provide a passenger with an image through which the traveling direction of the towed vehicle 20 is easily recognized, and can cause the passenger to recognize operation necessary for the next processing.

Third Embodiment

A third embodiment, in which a peripheral image that is displayed while controlling the steering unit such that a target angle is realized is changed, will be described. Since each configuration of the third embodiment is different from the first embodiment only in terms of a function and content of processing, description will be made by using the same reference signs.

When the hitch angle is larger than a second threshold angle, the image control unit 68 of the third embodiment causes the display unit 38 to display the peripheral image 84 obtained by superimposing a mirror image of a captured image from the imaging unit 14b provided in the rear portion of the tow vehicle 10 onto a captured image from other imaging units 14. The second threshold angle is an angle determined in advance, may be several tens of °, or may be stored in the storage unit 64 as part of the numerical value data 74.

Figure 14:
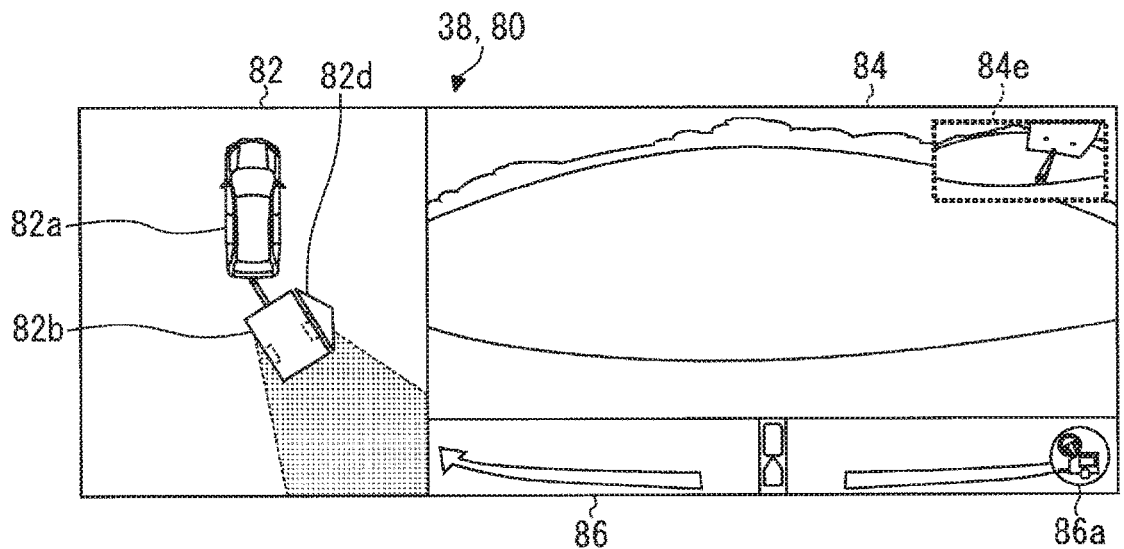
FIG. 14 is a view illustrating a display image in a case where a hitch angle is large in a third embodiment.

FIG. 14 is a view illustrating the display image 80 in a case where the hitch angle is large in the third embodiment. As shown in FIG. 14, in the third embodiment, when the hitch angle is larger than the second threshold angle, the image control unit 68 causes the display unit 38 to display the peripheral image 84 in a picture-in-picture mode, which is obtained by superimposing the mirror image from the imaging unit 14b in the rear portion of the tow vehicle 10 onto a mirror image of a captured image from the imaging unit 14e of the towed vehicle 20. Specifically, the image control unit 68 may generate the peripheral image 84, which is obtained by displaying the mirror image of the captured image from the imaging unit 14e over the entire area of the peripheral image 84 and superimposing the mirror image of the captured image from the imaging unit 14b, which is indicated with a dotted frame 84e and has a smaller area than the peripheral image 84, onto the mirror image of the captured image from the imaging unit 14e.

Figure 15:
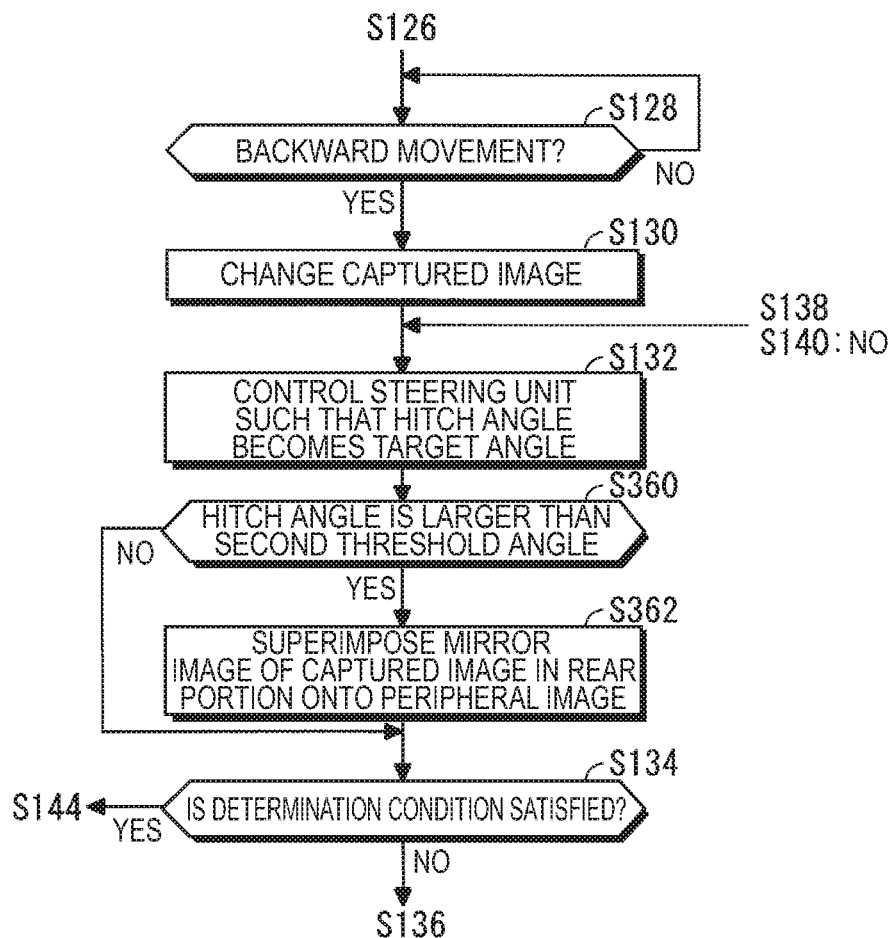
FIG. 15 is a part of a flow chart of driving support processing of the third embodiment, which is executed by a processing unit.

FIG. 15 is a part of a flow chart of driving support processing of the third embodiment, which is executed by the processing unit 62. Out of various types of driving support processing of the third embodiment, a portion different from the first embodiment will be mainly described, and some description will be omitted.

As shown in FIG. 15, in the third embodiment, when the setting unit 70 maintains a target angle (S126) and determines that the tow vehicle 10 has started backward movement (S128: Yes), the image control unit 68 changes the mirror image of the captured image from the imaging unit 14b in the rear portion of the tow vehicle 10, which is being used as the peripheral image 84, to the mirror image of the captured image from the imaging unit 14e of the towed vehicle 20 (S130). The setting unit 70 controls the steering unit 30 such that the hitch angle becomes the target angle (S132).

The image control unit 68 determines whether or not the hitch angle is larger than the second threshold angle (S360). In a case where the hitch angle is equal to or smaller than the second threshold angle (S360: No), the image control unit 68 executes processing subsequent to Step S134. When the hitch angle is larger than the second threshold angle (S360: Yes), the image control unit 68 displays the peripheral image 84 which is obtained by superimposing the mirror image of the captured image from the imaging unit 14b onto the mirror image of the captured image from the imaging unit 14e, which is being displayed as the peripheral image 84 as illustrated in FIG. 14 (S362). After then, the setting unit 70 executes processing subsequent to Step S134.

As described above, when the hitch angle is larger than the second threshold angle, the driving support device 60 of the third embodiment displays the peripheral image 84 obtained by superimposing the captured image from the imaging unit 14e of the towed vehicle 20 onto the captured image from the imaging unit 14b in the rear portion of the tow vehicle 10. Accordingly, when the hitch angle is large, the driving support device 60 can notify a passenger of a state where the tow vehicle 10 and the towed vehicle 20 are close to each other along with a state of the traveling direction of the towed vehicle 20.

Fourth Embodiment

A fourth embodiment, in which a peripheral image that is displayed while controlling the steering unit such that a target angle is realized is changed, will be described. Since each configuration of the fourth embodiment is different from the first embodiment only in terms of a function and content of processing, description will be made by using the same reference signs.

When the hitch angle is larger than the second threshold angle, the image control unit 68 of the fourth embodiment causes the display unit 38 to display the peripheral image 84 obtained by superimposing a mirror image of a captured image from the imaging unit 14b provided in the rear portion of the tow vehicle 10 onto a captured image from other imaging units 14. The second threshold angle may be, for example, several tens of °, or may be equal to or larger than the first threshold angle.

Figure 16:
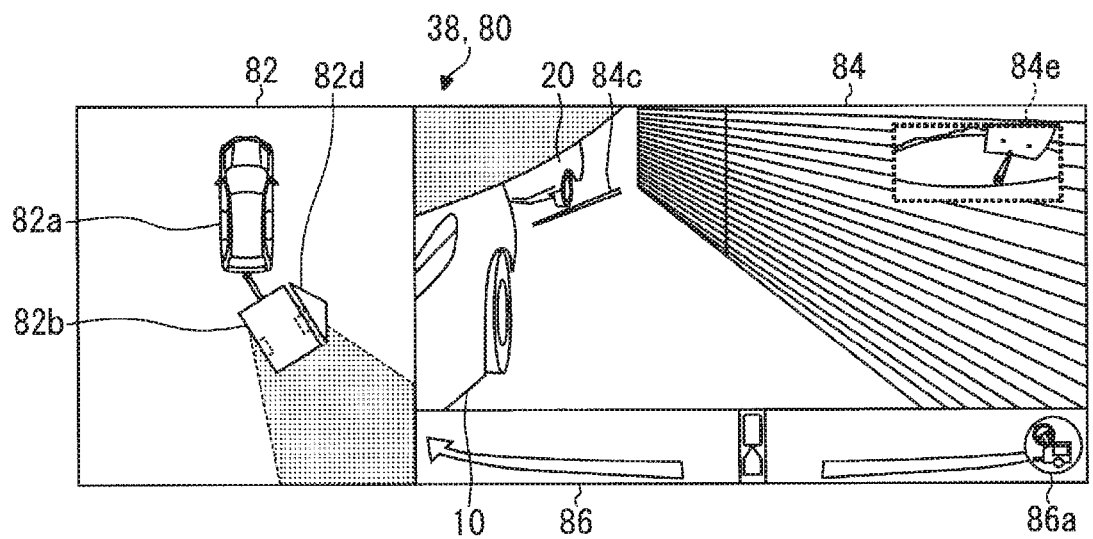
FIG. 16 is a view illustrating another display image in a case where a hitch angle is large in a fourth embodiment.

FIG. 16 is a view illustrating another display image 80 in a case where the hitch angle is large in the fourth embodiment. As shown in FIG. 16, in the fourth embodiment, when the hitch angle is larger than the second threshold angle, the image control unit 68 causes the display unit 38 to display the peripheral image 84 which is obtained by superimposing the mirror image from the imaging unit 14b in the rear portion of the tow vehicle 10 onto a mirror image of a captured image from the imaging unit 14 on the towed vehicle 20 side, out of the imaging units 14c and 14d on the right and the left. Specifically, the image control unit 68 may generate the peripheral image 84, which is obtained by displaying the mirror image of the captured image from the imaging unit 14 on the towed vehicle 20 side over the entire area of the peripheral image 84 and superimposing the mirror image of the captured image from the imaging unit 14b, which is indicated with the dotted frame 84e and has a smaller area than the peripheral image 84, onto the mirror image of the captured image from the imaging unit 14e on the towed vehicle 20 side.

Figure 17:
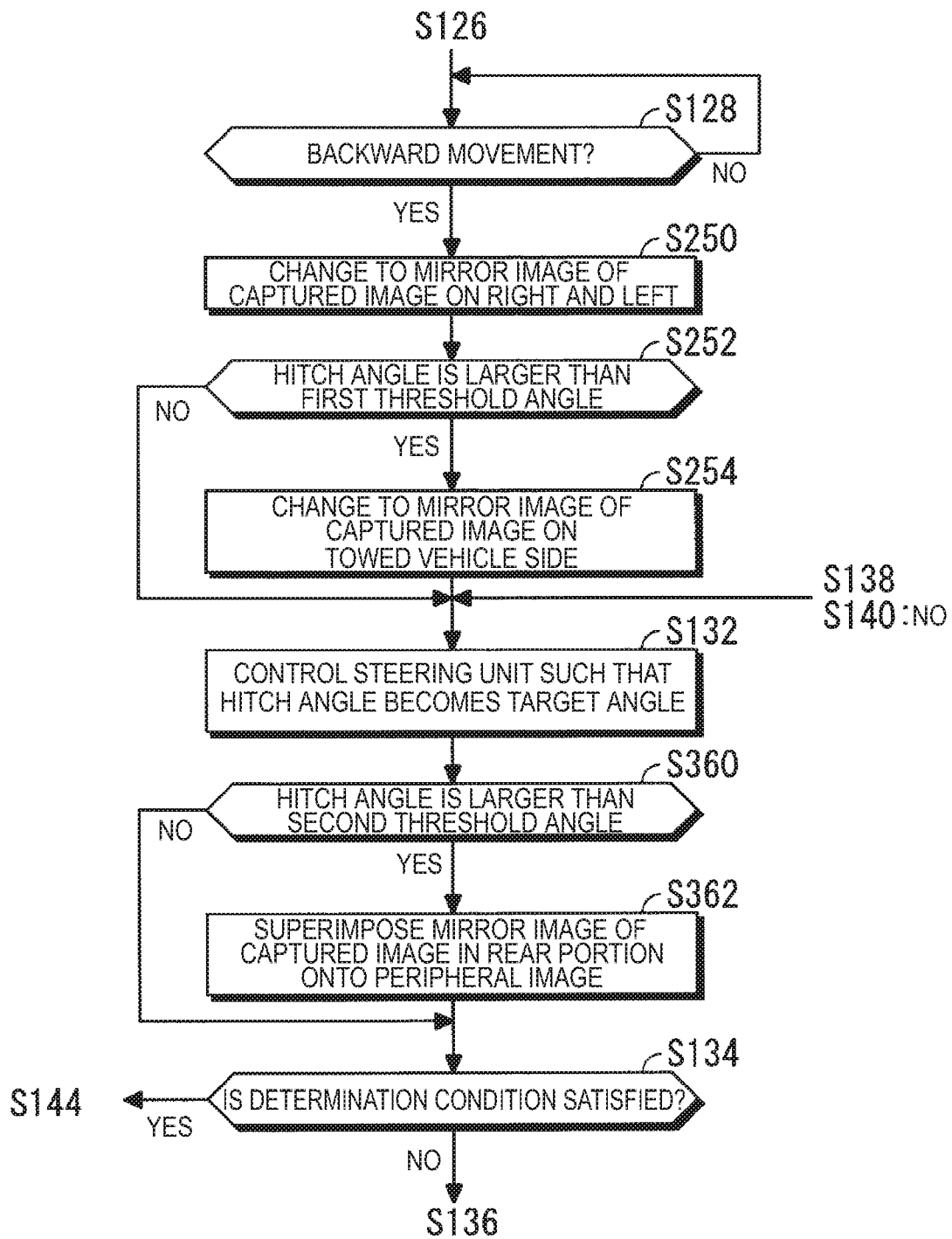
FIG. 17 is a part of a flow chart of driving support processing of the fourth embodiment, which is executed by a processing unit.

FIG. 17 is a part of a flow chart of driving support processing of the fourth embodiment, which is executed by the processing unit 62. Out of various types of driving support processing of the fourth embodiment, a portion different from the embodiments described above will be mainly described, and some description will be omitted.

As shown in FIG. 17, in the fourth embodiment, when the setting unit 70 maintains a target angle (S126) and determines that the tow vehicle 10 has started backward movement (S128: Yes), the image control unit 68 changes the peripheral image 84 from a mirror image of the captured image from the imaging unit 14b in the rear portion to mirror images of captured images from the imaging units 14c and 14d on the right and the left (S250).

The image control unit 68 determines whether or not the hitch angle is larger than the first threshold angle (S252). In a case where the hitch angle is equal to or smaller than the first threshold angle (S252: No), the image control unit 68 executes processing subsequent to Step S132. When the hitch angle is larger than the first threshold angle (S252: Yes), the image control unit 68 changes the mirror image of the captured image in the peripheral image 84 to the mirror image of the captured image from the imaging unit 14e on the towed vehicle 20 side (S254). At this time, the image control unit 68 superimposes the direction line along the traveling direction of the towed vehicle 20 onto the mirror image. The setting unit 70 causes the steering control unit 55 to control the steering unit 30 such that the hitch angle becomes the target angle (S132).

The image control unit 68 determines whether or not the hitch angle is larger than the second threshold angle (S360). In a case where the hitch angle is equal to or smaller than the second threshold angle (S360: No), the image control unit 68 executes processing subsequent to Step S134. When the hitch angle is larger than the second threshold angle (S360: Yes), the image control unit 68 displays the peripheral image 84 which is obtained by superimposing the mirror image of the captured image from the imaging unit 14b onto the mirror image of the captured image from the imaging unit 14e, which is being displayed as the peripheral image 84 as illustrated in FIG. 16 (S362). After then, the setting unit 70 executes processing subsequent to Step S134.

The driving support device 60 of the fourth embodiment achieves the same effects as the second embodiment and the third embodiment.

Fifth Embodiment

A fifth embodiment, in which a peripheral image that is a mirror image of a captured image selected according to a target angle is displayed, will be described. Since each configuration of the fifth embodiment is different from the first embodiment only in terms of a function and content of processing, description will be made by using the same reference signs.

When the target angle is larger than a third threshold angle, the image control unit 68 of the fifth embodiment causes the display unit 38 to display the peripheral image 84 in which display of a captured image from the imaging unit 14b provided in the rear portion of the tow vehicle 10 in the mirror image state is changed to display of a captured image from the imaging unit 14 that exists on the side where the towed vehicle 20 currently exists in the mirror image state. The third threshold angle is an angle determined in advance, may be several tens of °, or may be stored in the storage unit 64 as part of the numerical value data 74. For example, when the target angle is larger than the third threshold angle, the image control unit 68 of the fifth embodiment displays the display image 80 as illustrated in FIG. 12.

Figure 18:
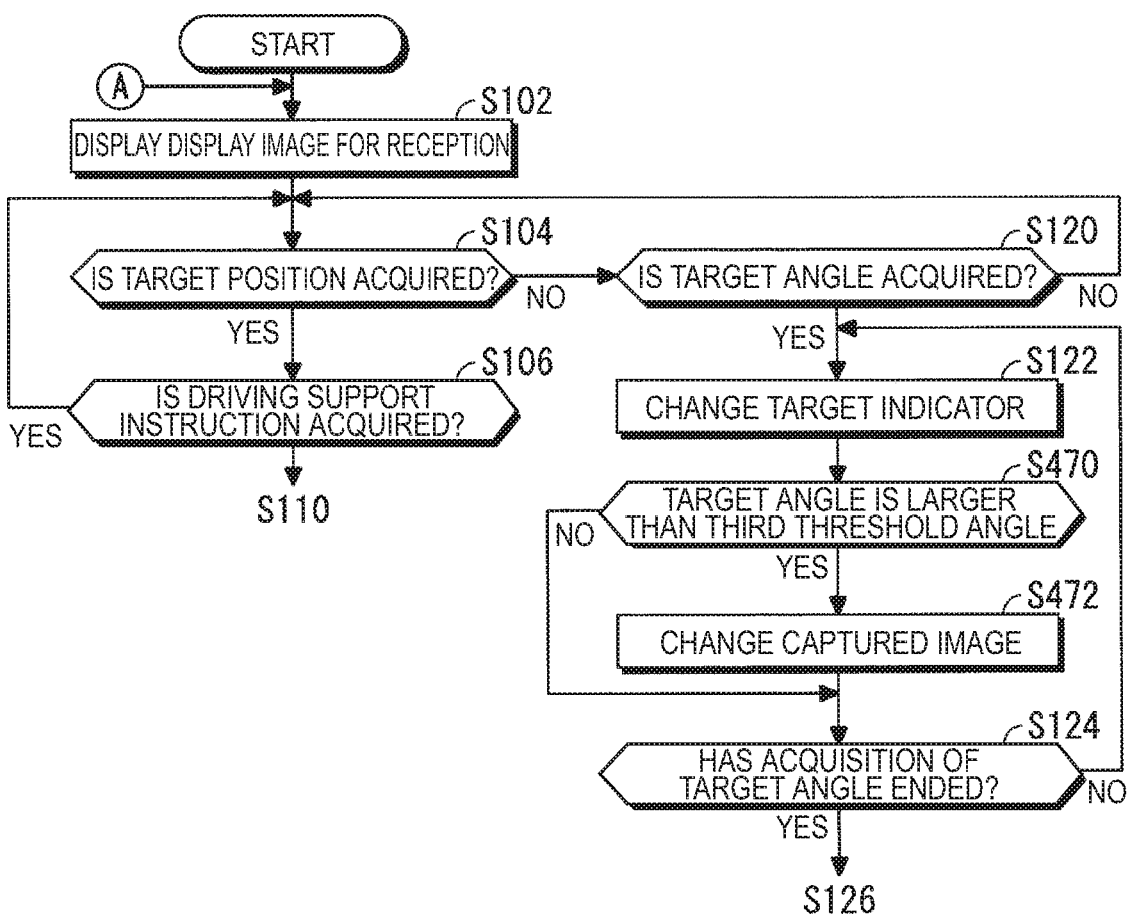
FIG. 18 is a part of a flow chart of driving support processing of a fifth embodiment, which is executed by a processing unit.

FIG. 18 is a part of a flow chart of driving support processing of the fifth embodiment, which is executed by the processing unit 62. Out of various types of driving support processing of the fifth embodiment, a portion different from the embodiments described above will be mainly described, and some description will be omitted.

As shown in FIG. 18, in the fifth embodiment, when the acquisition unit 66 acquires a target angle (S120: Yes), the image control unit 68 changes the target indicator 84a of the peripheral image 84 according to the target angle (S122). The image control unit 68 determines whether or not the target angle acquired by the acquisition unit 66 is larger than the third threshold angle (S470). When the image control unit 68 determines that the target angle is less than the third threshold angle (S470: No), the acquisition unit 66 executes Step S124. When it is determined that the target angle is larger than the third threshold angle (S470: Yes), the image control unit 68 causes the display unit 38 to display the peripheral image 84 in which the mirror image of the captured image from the imaging unit 14*b* provided in the rear portion of the tow vehicle 10 is changed to the mirror image of the captured image from the imaging unit 14 that exists on the side where the towed vehicle 20 currently exists (S472). Following this, the acquisition unit 66 executes Step S124.

As described above, when the target angle is larger than the third threshold angle, the driving support device 60 of the fifth embodiment causes the display unit 38 to display the mirror image of the captured image from the imaging unit 14 on the towed vehicle 20 side. Accordingly, when the target angle is large, the driving support device 60 can provide a passenger with a situation on the towed vehicle 20 side.

A function, a connection relationship, a number, and disposition of configurations of each embodiment described above may be changed and deleted as appropriate within the scope of the disclosure and a scope equivalent to the scope of the disclosure. The respective embodiments may be combined as appropriate. Procedures of the respective steps of each embodiment may be changed as appropriate.

Although an example in which the operation input unit 42 is a touch panel in order to perform slide operation onto the slider is described in the embodiments described above, the operation input unit 42 is not limited to the touch panel, and may be a device that can operate the slider. For example, the operation input unit 42 may be a device such as a touch pad provided in the tow vehicle 10. The operation input unit 42 may be a touch panel provided in a mobile communication device such as a smartphone.

Although automatic driving in which the steering unit 30 is controlled is described in the embodiments, an acceleration unit, such as an accelerator, a brake unit, such as a brake, and the transmission unit 32 may be controlled along with the steering unit 30 in automatic driving.

The image control unit 68 may superimpose a ghost view of the towed vehicle 20 onto the traveling direction of the towed vehicle 20. For example, the image control unit 68 may superimpose the ghost view of the towed vehicle 20, along with the direction line 84*c* illustrated in FIG. 12 or instead of the direction line 84*c*, onto the peripheral image 84.

Although the image control unit 68 causes the display unit 38 to display one peripheral image 84 obtained by connecting mirror images of captured images on the right and the left in a case where the hitch angle is less than the first threshold angle in the second embodiment, the image control unit may cause the display unit 38 to display the mirror image of the captured image obtained by the imaging unit 14*b*.

APPENDIX

A driving support device that controls a steering unit such that a hitch angle between a tow vehicle, which tows a towed vehicle, and the towed vehicle becomes a target angle set as a target, the device including: an image control unit that causes a display unit to perform display obtained by superimposing a direction line along a traveling direction of the towed vehicle onto a mirror image in which a captured image obtained by an imaging unit provided in the tow vehicle or the towed vehicle is used.

In the driving support device of the embodiment, the setting unit may maintain the target angle input from the input unit until a predetermined determination condition is satisfied, and may set the target angle to a reference angle in a case where the predetermined determination condition is satisfied.

Accordingly, the driving support device according to the embodiment omits continuation of operation for maintaining the target angle by a passenger using the input unit, and thus a finger of the passenger can be brought into a free state. Thus, operability can be further improved.

In the driving support device of the embodiment, the input unit may receive slide operation of the slider in a horizontal direction. In a case where the acquisition unit has received the slide operation of the slider to the left in the horizontal direction, the setting unit may set the target angle for moving the towed vehicle to the right in a case where the rear is seen from the tow vehicle. In a case where the acquisition unit has received the slide operation of the slider to the right of the horizontal direction, the setting unit may set the target angle for moving the towed vehicle to the left in a case where the rear is seen from the tow vehicle.

Accordingly, a passenger checks the display of the captured image in the mirror image state while performing slide operation onto the slider in a direction, to which the towed vehicle checked through the mirror image is intended to be moved. Therefore, the passenger can adjust the target angle as desired, and thus the driving support device according to the embodiment can realize intuitive operation.

In the driving support device of the embodiment, when the tow vehicle stops, the setting unit may assume that the determination condition is satisfied and set the target angle to the reference angle.

Accordingly, the driving support device according to the embodiment can return the maintained target angle to the reference angle through stopping without requiring a passenger to perform new operation such as reset.

In the driving support device of the embodiment, in a case where a prohibition condition for determining whether or not the input of the target angle is prohibited is satisfied, the image control unit may switch the setting image to an image showing that the input of the target angle is impossible.

Accordingly, in a case where the prohibition condition is satisfied, the driving support device according to the embodiment can notify a passenger that the target angle cannot be input.

In the driving support device of the embodiment, the image control unit may cause the display unit to perform the display of the captured image from the imaging unit, provided in a rear portion of the tow vehicle so as to image a connecting member which connects with the towed vehicle, in the mirror image state.

Accordingly, the driving support device according to the embodiment can cause a passenger to set the target angle while showing the angle of the connecting member, that is, the hitch angle.

In the driving support device of the embodiment, the image control unit may superimpose a target indicator that changes according to the target angle which is being input and indicates an indicator of a target position of the connecting member in the captured image onto the display of the captured image from the imaging unit, provided in the rear portion of the tow vehicle, in the mirror image state, and may cause the display unit to display the superimposed image.

Accordingly, the driving support device according to the embodiment can notify a passenger, through the target indicator, of which direction the towed vehicle should face with respect to the tow vehicle according to the target angle which is being input.

In the driving support device of the embodiment, the image control unit may cause the display unit to perform the display of the captured image from the imaging unit provided in the towed vehicle in the mirror image state.

Accordingly, the driving support device according to the embodiment can provide a passenger with a state of the backward movement direction of the towed vehicle through an image.

In the driving support device of the embodiment, the image control unit may cause the display unit to perform display of a pair of the captured images from a pair of the imaging units provided on both sides of the tow vehicle in the mirror image state.

Accordingly, the driving support device according to the embodiment can provide a passenger with an image having a wide area including a periphery on both of the right and the left of the tow vehicle.

In the driving support device of the embodiment, when the hitch angle is larger than a first threshold angle during control of the steering unit, the image control unit may cause the display unit to perform display of the captured image from the imaging unit on a side where the towed vehicle currently exists, out of the imaging units provided on both sides of the tow vehicle, in the mirror image state.

Accordingly, when the hitch angle is large, the driving support device according to the embodiment can provide a passenger with a state of the towed vehicle through a clearer image.

In the driving support device of the embodiment, the image control unit may superimpose, according to the hitch angle, a direction line along a traveling direction of the towed vehicle onto the display of the captured image from the imaging unit provided in the tow vehicle in the mirror image state, and may cause the display unit to perform display of the superimposed image.

Accordingly, the driving support device according to the embodiment can provide a passenger with an image through which the traveling direction of the towed vehicle is easily recognized.

In the driving support device of the embodiment, when the hitch angle is larger than a second threshold angle, the image control unit may superimpose the display of the captured image from the imaging unit provided in the rear portion of the tow vehicle in the mirror image state onto display of another captured image in the mirror image state.

Accordingly, when the hitch angle is large, the driving support device according to the embodiment can notify a passenger of a state where the tow vehicle and the towed vehicle are close to each other along with an image of a periphery of the tow vehicle based on another captured image.

In the driving support device of the embodiment, the acquisition unit may acquire input of a target position for guiding the tow vehicle and the towed vehicle. When the input of the target position is acquired, the image control unit may switch the setting image to an image showing that the input of the target angle is impossible.

Accordingly, when the input of the target position is acquired, the driving support device according to the embodiment can notify a passenger that it is unnecessary to input the target angle.

In the driving support device of the embodiment, in a case where the target angle is larger than a third threshold angle, the image control unit may select the captured image from the imaging unit provided on a side where the towed vehicle currently exists, out of a plurality of the imaging units provided on both sides of the tow vehicle, and may cause the display unit to display the selected captured image.

Accordingly, when the target angle is large, the driving support device according to the embodiment can provide a passenger with a situation on a towed vehicle side.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A driving support device that controls a steering unit such that a hitch angle between a tow vehicle, which tows a towed vehicle, and the towed vehicle becomes a target angle set as a target, the device comprising:
    an image control unit that causes a display unit to perform display of a captured image obtained by an imaging unit provided in the tow vehicle or the towed vehicle in a mirror image state, display of a setting image indicating the target angle input through an input unit, and display of a target indicator that changes according to the target angle superimposed on the captured image;
    an acquisition unit that acquires input of the target angle at the time of backward movement of the tow vehicle from the input unit, in a state where the setting image is displayed; and
    a setting unit that sets the target angle based on the input,
    wherein the setting unit maintains the target angle input from the input unit until a predetermined determination condition is satisfied, and sets the target angle to a reference angle in a case where the predetermined determination condition is satisfied, and
    wherein the predetermined condition is a stopping of the tow vehicle.

2. The driving support device according to claim 1, wherein
    the input unit receives a slide operation of a slider in a horizontal direction,
    in a case where the acquisition unit has received the slide operation of the slider to the left in the horizontal direction, the setting unit sets the target angle for moving the towed vehicle to the right in a case where the rear is seen from the tow vehicle, and
    in a case where the acquisition unit has received the slide operation of the slider to the right of the horizontal direction, the setting unit sets the target angle for moving the towed vehicle to the left in a case where the rear is seen from the tow vehicle.

3. The driving support device according to claim 2, wherein
    in a case where a prohibition condition for determining whether or not the input of the target angle is prohibited is satisfied, the image control unit switches the setting image to an image showing that the input of the target angle is impossible.

4. The driving support device according to claim 1, wherein when the tow vehicle stops, the setting unit assumes that the determination condition is satisfied and sets the target angle to the reference angle.

5. The driving support device according to claim 4, wherein in a case where a prohibition condition for determining whether or not the input of the target angle is prohibited is satisfied, the image control unit switches the setting image to an image showing that the input of the target angle is impossible.

6. The driving support device according to claim 1, wherein in a case where a prohibition condition for determining whether or not the input of the target angle is prohibited is satisfied, the image control unit switches the setting image to an image showing that the input of the target angle is impossible.

7. The driving support device according to claim 1, wherein the image control unit causes the display unit to perform the display of the captured image from the imaging unit, provided in a rear portion of the tow vehicle so as to image a connecting member which connects with the towed vehicle, in the mirror image state.

8. The driving support device according to claim 7, wherein the image control unit superimposes a target indicator that changes according to the target angle which is being input and indicates an indicator of a target position of the connecting member in the captured image onto the display of the captured image from the imaging unit, provided in the rear portion of the tow vehicle, in the mirror image state, and causes the display unit to display the superimposed image.

9. The driving support device according to claim 1, wherein the image control unit causes the display unit to perform the display of the captured image from the imaging unit provided in the towed vehicle in the mirror image state.

10. The driving support device according to claim 9, wherein when the hitch angle is larger than a second threshold angle, the image control unit superimposes the display of the captured image from the imaging unit provided in the rear portion of the tow vehicle in the mirror image state onto display of another captured image in the mirror image state.

11. The driving support device according to claim 1, wherein the image control unit causes the display unit to perform display of a pair of the captured images from a pair of the imaging units provided on both sides of the tow vehicle in the mirror image state.

12. The driving support device according to claim 11, wherein when the hitch angle is larger than a first threshold angle during control of the steering unit, the image control unit causes the display unit to perform display of the captured image from the imaging unit on a side where the towed vehicle currently exists, out of the imaging units provided on both sides of the tow vehicle, in the mirror image state.

13. The driving support device according to claim 11, wherein the image control unit superimposes, according to the hitch angle, a direction line along a traveling direction of the towed vehicle onto the display of the captured image from the imaging unit provided in the tow vehicle in the mirror image state, and causes the display unit to perform display of the superimposed image.

14. The driving support device according to claim 1, wherein the acquisition unit acquires input of a target position for guiding the tow vehicle and the towed vehicle, and when the input of the target position is acquired, the image control unit switches the setting image to an image showing that the input of the target angle is impossible.

15. The driving support device according to claim 1, wherein in a case where the target angle is larger than a third threshold angle, the image control unit selects the captured image from the imaging unit provided on a side where the towed vehicle currently exists, out of a plurality of the imaging units provided on both sides of the tow vehicle, and causes the display unit to display the selected captured image.

\* \* \* \* \*